United States Patent
Maccanti et al.

(10) Patent No.: US 11,928,029 B2
(45) Date of Patent: *Mar. 12, 2024

(54) BACKUP OF PARTITIONED DATABASE TABLES

(71) Applicant: Amazon Technologies, Inc., Seattle, WA (US)

(72) Inventors: Maximiliano Maccanti, Bellevue, WA (US); Timothy Andrew Rath, Seattle, WA (US); Rama Krishna Sandeep Pokkunuri, Seattle, WA (US); Akshat Vig, Seattle, WA (US); Clarence Wing Yin Ng, Daly City, CA (US); Srivaths Badrinath Copparam, Issaquah, WA (US); Rajaprabhu Thiruchi Loganathan, Issaquah, WA (US); Wei Xiao, Kirkland, WA (US); William Alexander Stevenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 715 days.

This patent is subject to a terminal disclaimer.

(21) Appl. No.: 17/019,072

(22) Filed: Sep. 11, 2020

(65) Prior Publication Data
US 2021/0064476 A1    Mar. 4, 2021

Related U.S. Application Data

(63) Continuation of application No. 15/495,827, filed on Apr. 24, 2017, now Pat. No. 10,776,212, which is a
(Continued)

(51) Int. Cl.
*G06F 11/14*   (2006.01)
*G06F 11/20*   (2006.01)

(52) U.S. Cl.
CPC ...... *G06F 11/1451* (2013.01); *G06F 11/1464* (2013.01); *G06F 11/1469* (2013.01);
(Continued)

(58) Field of Classification Search
CPC ............ G06F 11/1451; G06F 11/1464; G06F 11/1469; G06F 11/1458; G06F 11/2094; G06F 2201/80
See application file for complete search history.

(56) References Cited

U.S. PATENT DOCUMENTS 6,366,987 B1    4/2002    Tzelnic et al.
6,490,722 B1    12/2002   Barton et al.
(Continued)

OTHER PUBLICATIONS

U.S. Appl. No. 15/495,815, filed Apr. 24, 2017, Maximiliano Maccanti et al.
(Continued)

*Primary Examiner* — Mark D Featherstone
*Assistant Examiner* — Tony Wu
(74) *Attorney, Agent, or Firm* — Robert C. Kowert; Kowert, Hood, Munyon, Rankin & Goetzel, P.C.

(57) ABSTRACT

A system that implements a data storage service may store data for a database table in multiple replicated partitions on respective storage nodes. In response to a request to back up a table, the service may back up individual partitions of the table to a remote storage system independently and (in some cases) in parallel, and may update (or create) and store metadata about the table and its partitions on storage nodes of the data storage service and/or in the remote storage system. Backing up each partition may include exporting it from the database in which the table is stored, packaging and compressing the exported partition for upload, and uploading the exported, packaged, and compressed partition to the remote storage system. The remote storage system may be a
(Continued)

key-value durable storage system in which each backed-up partition is accessible using its partition identifier as the key.

20 Claims, 19 Drawing Sheets

Related U.S. Application Data continuation of application No. 14/032,883, filed on Sep. 20, 2013, now Pat. No. 9,633,051.

(52) U.S. Cl.
CPC ...... *G06F 11/1458* (2013.01); *G06F 11/2094* (2013.01); *G06F 2201/80* (2013.01)

(56) References Cited

U.S. PATENT DOCUMENTS

| | | |
|---|---|---|
| 6,505,216 B1 | 1/2003 | Schutzman et al. |
| 8,676,759 B1 | 3/2014 | Zhu et al. |
| 8,712,967 B1 | 4/2014 | Weaver et al. |
| 8,930,312 B1 | 1/2015 | Rath et al. |
| 9,053,167 B1 | 6/2015 | Swift et al. |
| 9,632,878 B1 | 4/2017 | Maccanti et al. |
| 9,633,051 B1 | 4/2017 | Maccanti et al. |
| 9,665,443 B1 | 5/2017 | Nagendran et al. |
| 2002/0049950 A1 | 4/2002 | Loaiza et al. |
| 2004/0044707 A1 | 3/2004 | Richard |
| 2004/0073582 A1 | 4/2004 | Spiegel |
| 2005/0010869 A1 | 1/2005 | Truelove et al. |
| 2005/0102669 A1 | 5/2005 | Marney et al. |
| 2005/0165906 A1 | 7/2005 | Deo et al. |
| 2005/0223277 A1 | 10/2005 | Ballard |
| 2006/0070019 A1 | 3/2006 | Vishnumurty et al. |
| 2006/0085378 A1 | 4/2006 | Raizman et al. |
| 2006/0190243 A1 | 8/2006 | Barkai et al. |
| 2007/0043749 A1 | 2/2007 | Gerber et al. |
| 2007/0143259 A1 | 6/2007 | Uppala |
| 2007/0174325 A1 | 7/2007 | Mooney et al. |
| 2008/0046400 A1 | 2/2008 | Shi et al. |
| 2008/0162443 A1 | 7/2008 | Asai et al. |
| 2008/0208933 A1 | 8/2008 | Lyon |
| 2008/0243949 A1 | 10/2008 | Anguelov |
| 2008/0307018 A1 | 12/2008 | Ulrich et al. |
| 2009/0157776 A1 | 6/2009 | McGarvey |
| 2010/0088439 A1 | 4/2010 | Ang et al. |
| 2011/0178985 A1 | 7/2011 | San Martin Arribas et al. |
| 2011/0196822 A1 | 8/2011 | Zunger et al. |
| 2011/0261395 A1 | 10/2011 | Kim et al. |
| 2012/0030176 A1 | 2/2012 | Gelson et al. |
| 2012/0030408 A1 | 2/2012 | Flynn et al. |
| 2012/0117345 A1 | 5/2012 | Kaneda et al. |
| 2012/0136835 A1 | 5/2012 | Kosuru et al. |
| 2012/0150815 A1 | 6/2012 | Pafumi et al. |
| 2012/0166576 A1 | 6/2012 | Orsini et al. |
| 2013/0013569 A1 | 1/2013 | Pafumi et al. |
| 2013/0066838 A1 | 3/2013 | Singla et al. |
| 2013/0197868 A1 | 8/2013 | Olsson et al. |
| 2013/0212263 A1 | 8/2013 | Breslin et al. |
| 2013/0246366 A1 | 9/2013 | Preslan et al. |
| 2013/0290249 A1 | 10/2013 | Merriman et al. |
| 2013/0311429 A1 | 11/2013 | Agetsuma et al. |
| 2013/0311612 A1 | 11/2013 | Dickinson |
| 2014/0181031 A1 | 6/2014 | Kumarasamy et al. |
| 2014/0310244 A1 | 10/2014 | Chambliss et al. |
| 2014/0310245 A1 | 10/2014 | Novick et al. |
| 2016/0274977 A1 | 9/2016 | Vijayan et al. |

OTHER PUBLICATIONS

U.S. Appl. No. 14/032,870, filed Sep. 20, 2013, Maximiliano Maccanti, et al.
U.S. Appl. No. 14/032,894, filed Sep. 20, 2013, Maximiliano Maccanti, et al.

BACKUP OF PARTITIONED DATABASE TABLES

This application is a continuation of U.S. patent application Ser. No. 15/495,827, filed Apr. 24, 2017, which is a continuation of U.S. patent application Ser. No. 14/032,883, filed Sep. 20, 2013, now U.S. Pat. No. 9,633,051, which are hereby incorporated by reference herein in their entirety.

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

In order to be able to recover from the malicious or inadvertent deletion of tables (or of portions thereof) and/or from logical data corruption, database users may wish to back up their tables periodically or on demand. However, it can be difficult to back up tables that are stored in large databases in which the data for each table is distributed across multiple, independent partitions and replicated across multiple machines in an efficient and consistent manner.

Figure 1:
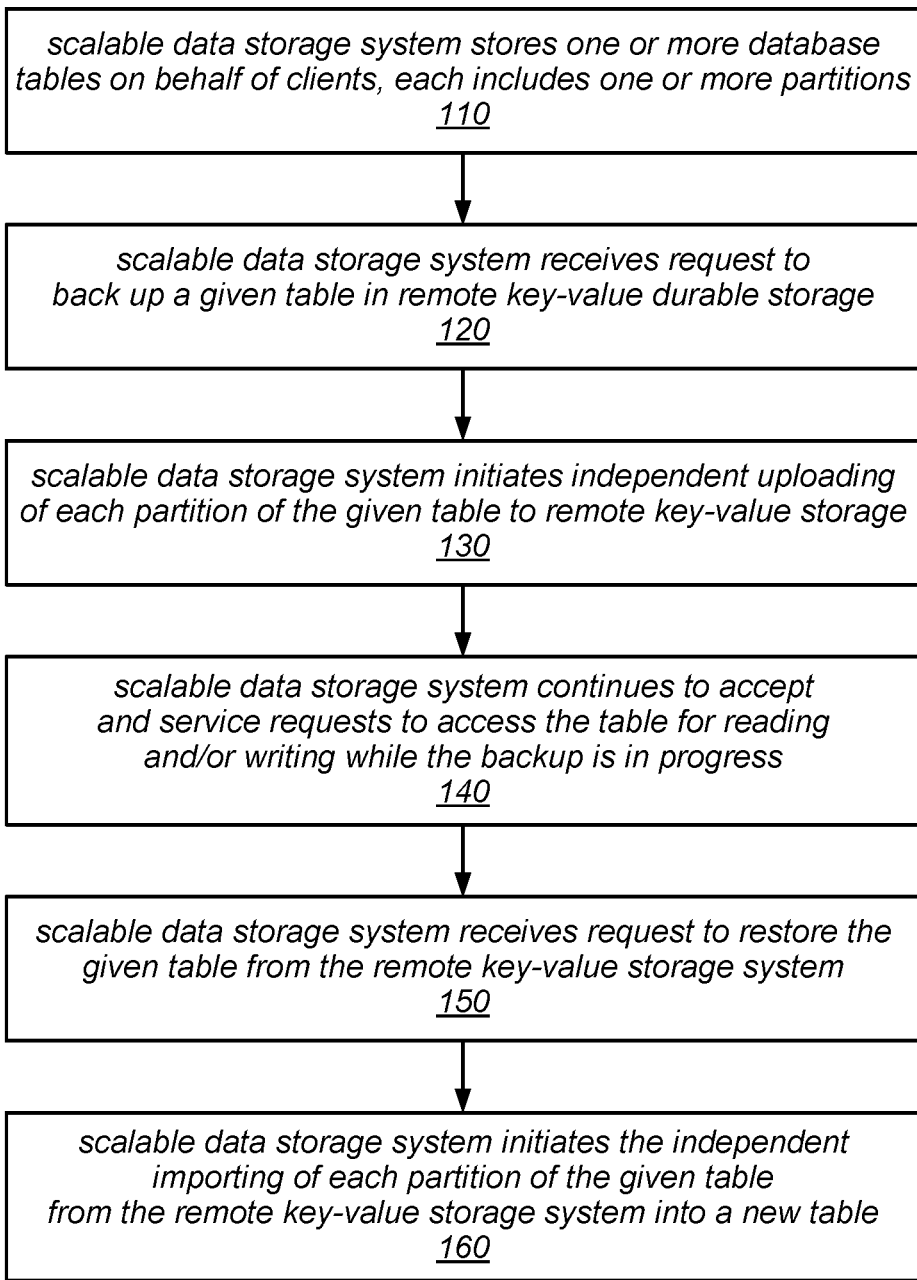
FIG. 1 is a flow diagram illustrating one embodiment of a method for backing up and restoring database tables.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a Web-based service that provides data storage services to storage service clients (e.g., user, subscribers, or client applications that access the data storage service on behalf of users or subscribers). The service may in some embodiments support the seamless scaling of tables that are maintained on behalf of clients in a non-relational data store, e.g., a non-relational database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table as an asynchronous operation while the database continues to receive, accept, and service read and/or write operations that are directed to the table. In some embodiments, in response to a request to back up a table, the system may create a backup of each individual partition independently and (in some cases) in parallel (i.e., substantially concurrently). When a request to back up a table is received, the system may guarantee that all write operations that were directed to the table up to that point are included in the backup. However, the system may not guarantee that the backup operation produces a consistent view of the entire table (e.g., a consistent point-in-time snapshot of the table). Instead, the system may guarantee only that the backup includes a consistent view of each partition of the table. In some embodiments, this somewhat relaxed level of consistency in the backup may be sufficient for subsequently restoring the table, given the data model and constraints of the data storage system itself. For example, in some embodiments, the distributed data storage systems described herein (e.g., those that provide database services) may not support transactions across database table rows, but only item-level transactions (e.g., transactions in which all write operations are directed to a single row). In such embodiments, there may be no requirement for consistency between partitions of the table.

In some embodiments, backup operations may be initiated by data storage service users (e.g., customers, service subscriber, and/or clients applications) using a "CreateBackup" application programming interface (API). In some embodiments, the systems described herein may support the scheduling of backups (e.g., every day at a particular time, or according to a published, but not necessarily periodic, schedule). In response to receiving a request to back up a table, these systems may back up each partition of the table as an individual item in a remote storage system (e.g., a key-value durable storage system), and may store metadata about the backup that is subsequently usable when restoring the backup to a new database (e.g., a new database table). In some embodiments, the system may be configured to initiate separate backup operations for each of the partitions of a table automatically (e.g., programmatically and without user intervention) in response to a request to back up the table, and to manage those backup operations on a per-partition basis (again, without user involvement).

As described in more detail herein, in some embodiments, when restoring a table from a backup, the systems described herein may provide the option to change the values of one or more of the configuration parameters of the restored table from their values in the original table (i.e., the table that was the source of the backup). For example, in some embodiments, these systems may support the application of a change to the provisioned storage capacity for a table (or for one or more of its partitions), a change to the provisioned throughput capacity for a table (or for one or more of its partitions), or a change (or addition) to the indexing options for a table (and its partitions). In some cases, such changes may automatically trigger further adjustments to the new table (e.g., a partition split, move, or merge operation). In some embodiments, following a restore operation, the new (i.e., restored) table may be mapped to a different set of resources, which may be reflected in the metadata for the new table.

In some embodiments, when a table is backed up, the backup operation for each partition may include an operation to verify that the partition will be able to be restored. In other words, when a user requests that a backup be taken for one of their tables, the data storage system may be configured to automatically verify that the partition backups (and, therefore, the table backup) was not corrupted or otherwise made unsuitable for restoration during the backup process (e.g., by any packaging, compression, or encryption processes that may have been applied to prepare them for uploading to the remote storage system). For example, in various embodiments, each of the copies of the partitions that have been prepared for uploading may be re-inflated, verified against a previously generated checksum for the corresponding source partition, spot-checked for data corruption, and/or re-imported into the data storage system as an additional replica of the source partition as part of such a verification. In such embodiments, the data storage system may not return an indication of the success of the backup until and unless such a verification determines that all of the backed up partitions will be able to be restored.

In some embodiments, the service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the service may in some embodiments initiate the re-sizing (scaling) and/or repartitioning of a table programmatically in response to receiving one or more requests to store, retrieve, modify, or delete items in the scalable table. In some embodiments, a table may be repartitioned in response to crossing a pre-determined maximum threshold for the amount or percentage of resources (e.g., storage resource capacity or throughput capacity) that are provisioned to implement various tables, partitions, and replicas on the storage devices (or logical volumes) of a storage node. As used herein, the term "repartitioning" may be used to describe any of a variety of types of partition management operations, in different embodiments. For example, repartitioning a table may include splitting a partition (or one or more replicas of a partition) into multiple smaller partitions and/or moving one or more partitions (or replicas thereof) from one storage node (or storage device) to a different storage node (or storage device).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created or restored from backup, or may be client-specific, account-specific, specific to various table types, or specified by system-wide default values, rather than being specified on a per-request basis. The API may support extreme scaling and/or more predictable performance than that provided by prior data storage systems and services.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created or restored from backup, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments, the selection of particular storage nodes and/or storage devices (or volumes) on which to store each table, partition, or replica (e.g., when it is originally created and/or when it is restored from backup) may be determined locally (e.g., by the storage nodes themselves), centrally (e.g., by a component that manages and/or allocates resources for multiple storage nodes using global criteria), or by various combinations of local and global resource management and allocation processes, in different embodiments. For example, in some embodiments, a partition replica may be assigned to a particular storage node based (at least in part) on whether there is enough storage capacity for the anticipated size of the partition replica and/or on whether there is enough provisioned throughput capacity (e.g., in terms of input/output operations per second, or IOPS) for the anticipated work load directed to the partition replica. In some embodiments, the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. As described in more detail herein, in some embodiments, an UpdateTable operation may be automatically invoked by the system in response to a change in the storage or throughput capacity for a table (or various partitions thereof) that was specified as part of an operation to restore the table from a backup.

In some embodiments of the distributed database systems described herein, each storage node may include multiple storage devices or logical volumes, each of which stores various partition replicas. For example, in one embodiment each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partition, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

In various embodiments, if a partition management operation is requested (e.g., by a client process, by a balancing process, by a failover process, by a restore process, or as a result of another type of trigger), the destination storage nodes (and/or devices/volumes thereof) for those operations may be selected locally (e.g., by the storage nodes themselves), centrally (e.g., by a component that manages and/or allocates resources for multiple storage nodes using global criteria), or by various combinations of local and global resource management and allocation processes. For example, various techniques may be applied to select a storage node and/or particular storage devices/volumes on which to place a particular table, partition, or replica as part of creating a table, restoring a table from backup, partitioning a table (e.g., at creation/restoration or later), replicating a table (or a partition thereof), splitting a partition (or partition replica), or moving a partition (or partition replica), some of which are described in detail herein.

As noted above, from user's perspective, a backup operation operates to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). In some embodiments, this metadata may be stored in the data storage system itself, and a copy of the metadata may also be stored in the remote storage system into which tables are backed up. The metadata uploaded to the remote storage system as part of a backup operation may include the table schema (e.g., the hash key and range key set up for table, and the maximum item size) or, in general, any of all information about the table at the time of the backup (e.g., all of the metadata of the table at the time of backup), and also information about each backup operation for the table (e.g., the time is was requested, by whom it was requested, the time at which it finished, and/or an indication of whether it was copied to other regions). In some embodiments, the metadata that is uploaded to the remote storage system as part of a backup operation may also include an indication of the version of the database software under which the source table was created and/or backed up, an indication of the storage format version that was used for the backup, an indication of the version of the packaging, compression, or uploading mechanisms that were used in the backup process, a checksum for each partition (e.g., a checksum generated according to the MD5 message digest algorithm), the BackupID for the backup, and/or any other information that may be usable in a subsequent operation to restore the table and/or to verify the consistency of the restored table.

As previously noted, in some embodiments, write requests may continue to be serviced while backups are in progress. In some such embodiments, the backup process for each partition may include adding a new replica group member, exporting the partition into the new replica, and applying any pending write operations that were received up to the point that the backup was requested (e.g., to catch up with its peers and/or so that the exported partition reflects latest modifications done to the table data by the customer prior to the backup request). Once the new replica has caught up to the point of the backup request, the backup process may include uploading the new replica to a remote storage system (e.g., in the local region) and storing the metadata about the partition in various metadata tables (e.g., in the distributed data storage system and/or in the remote storage system into which the partition is backed up). Again note that although each partition backup represents a consistent view of the partition (at least up to the last transaction that was received prior to the backup request), the backed up partitions may not (collectively) represent a consistent, point-in-time snapshot of the entire table.

One embodiment of a method for backing up and restoring database tables is illustrated by the flow diagram in FIG. 1. As illustrated at 110, in this example, the method may include a scalable data storage system storing one or more database tables on behalf of clients, each of which includes one or more partitions. The method may include the scalable data storage system receiving a request to back up a given table in a remote key-value durable storage (as in 120) and, in response to the request, the scalable data storage system initiating the uploading of each individual partition of the given table to the remote key-value storage system as independent operations, as in 130. For example, each partition (e.g., a copy of each partition exported from the database) may be uploaded to the remote key-value storage system as a separate item that is associated with a respective key.

As described in more detail herein, the copy of each partition that is uploaded to the remote key-value storage system may represent a consistent view of the partition, reflecting the application of at least of all write accesses that were directed to the partition and received (e.g., within a transaction) prior to the request to back up the table being received. However, the copies of all the partitions may or may not collectively represent a consistent view of the database table as a whole. For example, while the copy of each partition that is uploaded to the remote key-value storage system may only be guaranteed to reflect the application of all writes directed to the partition that were received prior to the request to back up the table, one or more additional writes directed to the partition that were received after to the request to back up the table but prior to completing the uploading of all the copies of the partitions may or may not also be reflected in the partition. In some embodiments, because such additional writes may or may not be reflected in various ones of the copies of the partitions that are uploaded to the remote key-value storage system, the copies of the partitions that are uploaded to the remote key-value storage system may or may not collectively represent a consistent point-in-time snapshot of the entire database table.

As illustrated in FIG. 1, the method for backing up and restoring database tables may include the scalable data storage system continuing to accept and service requests to access the table for reading and/or writing while the backup is in progress, as in 140. At some point subsequent to the partitions being uploaded into the remote key-value storage system, the method may include the scalable data storage system receiving a request to restore the given table from the remote key-value storage system, as 150. In response to this request, the method may include the scalable data storage system initiating the independent importing of each partition of the given table (e.g., each of the copies of the partitions that were uploaded to the remote key-value storage system) from the remote key-value storage system into a new table, as in 160. As described in more detail herein, in some embodiments, various configuration parameter values for the new table may be modified from their values in the original table as part of the restore operation.

Figure 2:
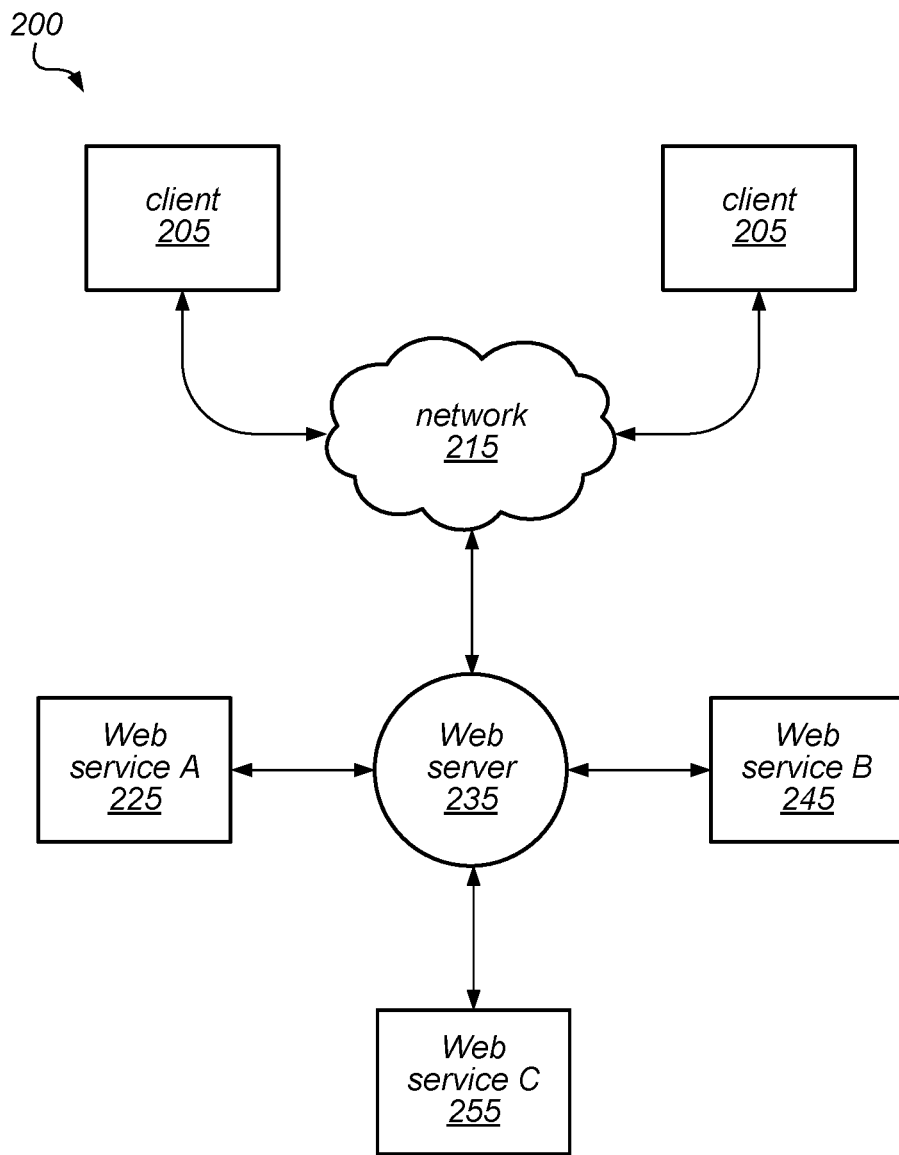
FIG. 2 is a block diagram illustrating one embodiment of a system that provides various Web-based services to clients.

Various techniques described herein (including those for backing up and/or restoring partitioned database tables) may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of computational resources, database services, data storage services (e.g., maintaining data in one or more tables on behalf of a client), or any other types of services or shared resources.

Figure 3:
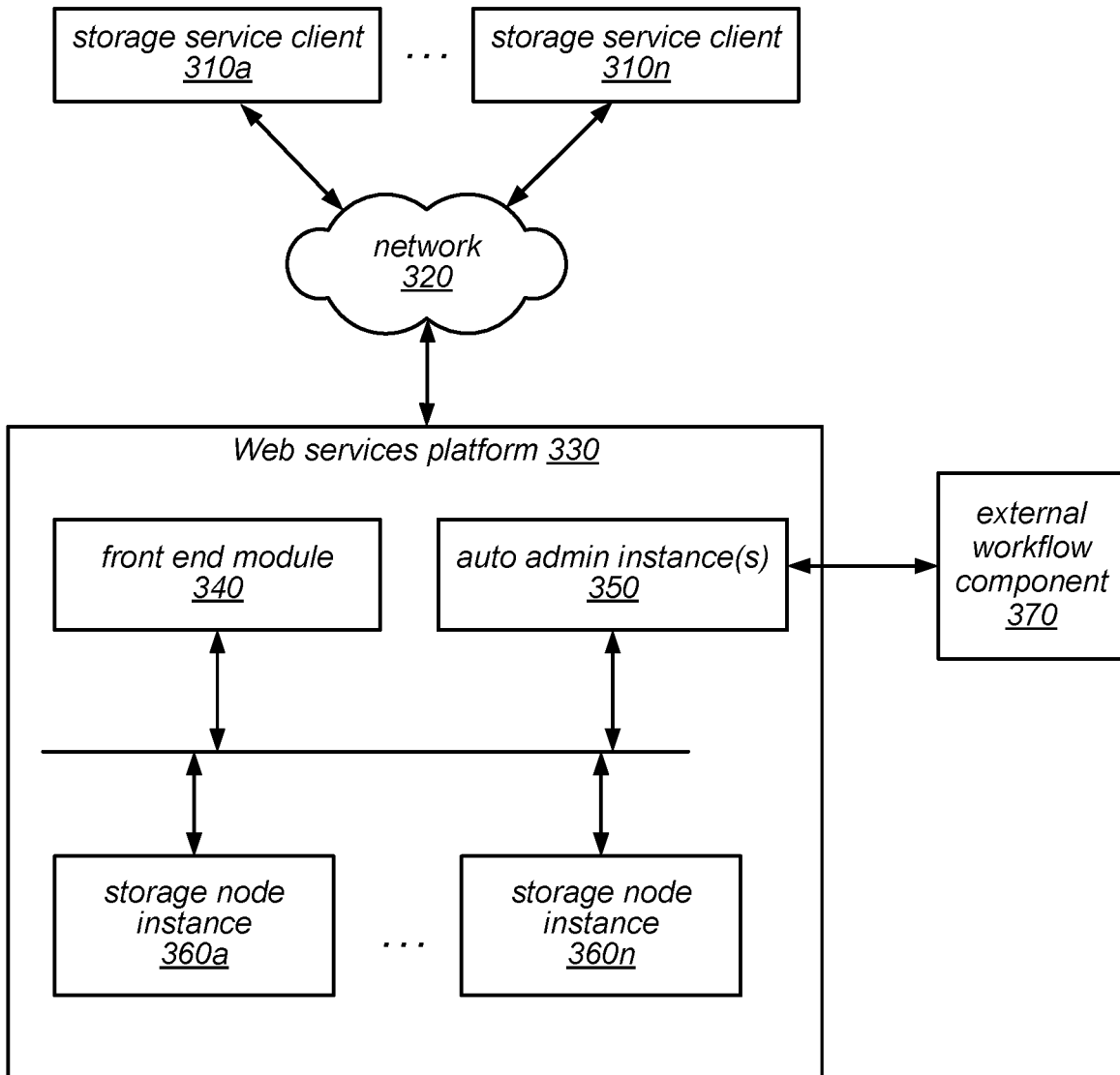
FIG. 3 is a block diagram illustrating one embodiment of a system architecture that is configured to implement a Web services-based data storage service.

One embodiment of a system architecture that is configured to implement a Web services-based data storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computing node illustrated in FIG. 19 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. In some embodiments, each of the multiple auto admin instances may be responsible for managing and/or allocating the resources of a subset of the storage node instances 360 (e.g., the storage capacity and/or throughput capacity of the storage node instances 360 and/or their underlying storage devices or virtual storage volumes). For example, in some embodiments, each auto admin instance 350 may be configured to select a storage node and/or particular storage devices or virtual storage volumes on which to place various tables, partitions, and replicas, which may include receiving metadata about the storage nodes and/or storage devices/volumes, recommendations of storage devices/volumes on which to place the tables, partitions, and replicas, confirmation of resource reservations, or other information from the storage node instances for which it provides administrative functionality. Some of the functionality provided by each of these types of components is described in more detail herein, according to various embodiments.

Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components or modules of the system that use external workflow component 370 may include these interfaces rather than interfacing directly to the interfaces provided by external workflow component 370. In some embodiments, the Web services platform 330 may rely on one or more external (and in some cases shared) resources, in addition to external workflow component 370. In some embodiments, external workflow component 370 may be used to perform distributed operations, such as those that extend beyond a particular partition replication group.

As described in more detail herein, in some embodiments, external workflow component 370 may include a workflow manager (e.g., a state machine) that controls, coordinates, and monitors the progress of various backup and restore operations. For example, external workflow component 370 may be configured to keep track of what has been done (e.g., which partitions have been backed up or restored) and pending work (e.g., which partitions have not yet been successfully backed up or restored), and/or to handle failures encountered during backup and restore operations (e.g., to initiate retries). In some embodiments, requests for backup and restore operations may be received by the front end module 340, which may log the requests. In some embodiment, logging such a request may subsequently trigger an action by an auto admin instance 350 to invoke external workflow component 370, which may manage the backup or restore operation. Note that if two different storage system users have tables with partitions on the same machine that they want to back up, the external workflow component 370 may be configured to avoid resource conflicts or overuse (e.g., by using alternate replicas of some of the partitions on different machines as the source for their backup operations).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
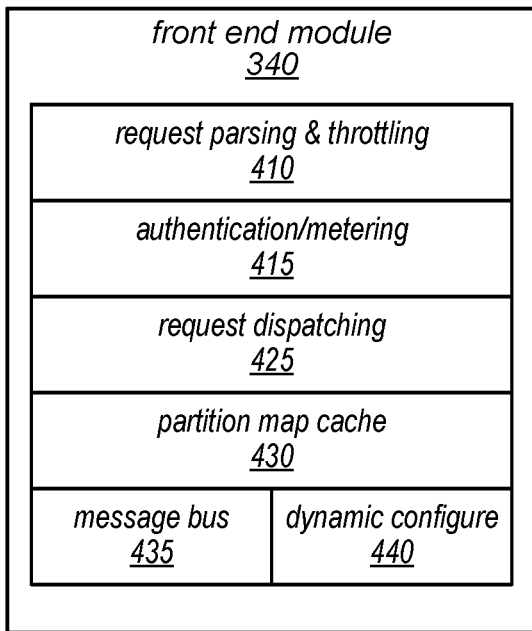
FIGS. 4A-4C are block diagrams illustrating various components of a Web services platform, according to one embodiment.
Figure 4B:
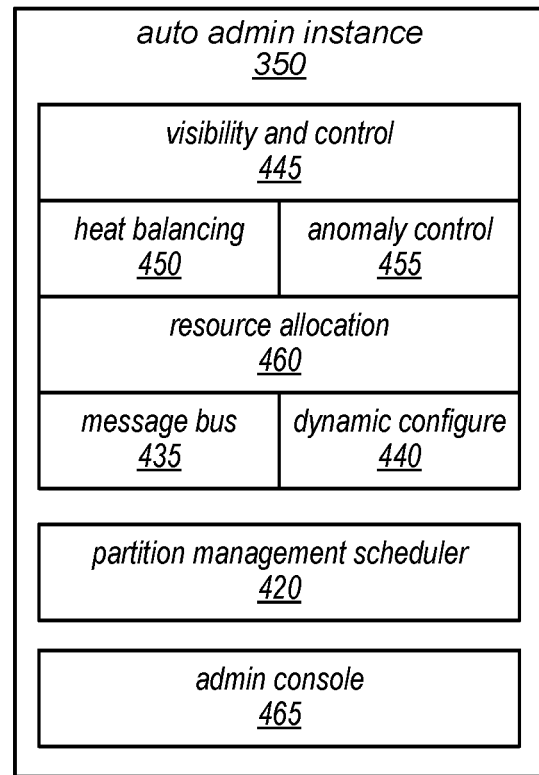
Figure 4C:
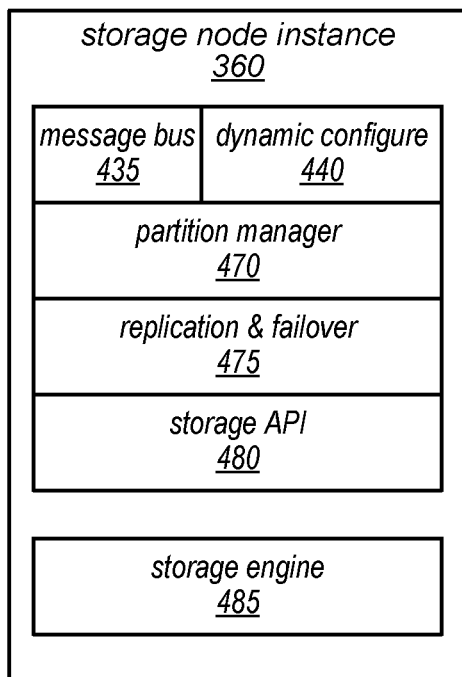

FIGS. 4A-4C illustrate various elements or modules that may be included in each of the types of components of Web services platform 330, according to one embodiment. As illustrated in FIG. 4A, front end module 340 (which may sometimes be referred to herein as a request router) may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of Web services platform 330 or in a component configured to interact with Web services platform 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, and/or anomaly control module 455 may be configured to work separately or in combination to perform selection, ordering, or scheduling of candidate partition management operations (e.g., various partition splitting operations or partition moving operations) and/or to select destination storage nodes (and/or particular storage devices/volumes) for those operations. In other embodiments, a central partition management scheduler module 420 (which may perform some or all of these partition management functions) may be included in auto admin instance 350, as illustrated in FIG. 4B. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific modules, auto admin instance 350 may also include components that are common to the different types of computing nodes that collectively implement Web services platform 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned (or reserved) resources on the storage devices or logical storage volumes of the storage node instance. For example, the partition manager may be configured to apply one or more resource utilization policies or partition management policies to make local decisions about which, if any, partitions or partition replicas stored on the local storage devices or logical storage volumes should be split or moved. Once the partition manager 470 (or another component of storage node instance 360) identifies one or more candidate partition management operations, information about the candidate partition management operations may be sent to an auto admin instance 350 (e.g., to a central partition management scheduler 420 of an auto admin instance 350), which may schedule the candidate partition management operations for execution based on a global prioritization across the distributed database system. In other embodiments, resource utilization information may be sent from each storage node instance 360 to an auto admin instance 350 (e.g., to a central partition management scheduler 420 of an auto admin instance 350), which may identify candidate partition management operations, and may schedule the candidate partition management operations for execution based on a global prioritization across the distributed database system.

In some embodiments, the partition manager 470 (or another component of storage node instance 360) may be configured to provide metadata about the storage node and/or its storage devices/volumes, recommendations of particular storage devices/volumes on which to place tables, partitions, and replicas, confirmation of resource reservations, or other information to the auto admin instance 350 that provides administrative functionality for the storage node instance 360. For example, in some embodiments, the partition manager 470 (or another component of storage node instance 360) may be configured to determine whether it can host a particular table, partition, or replica (e.g., based on the available storage and/or throughput capacity of the storage node instance), and/or to identify the particular storage devices/volumes on which a particular table, partition, or replica can be placed.

As described in more detail herein, backup and/or restore operations for database tables may be initiated through requests received by front end module 340, in some embodiments. In other embodiments, backup and/or restore operations for database tables may be initiated through an admin console 465 of an auto admin instance 350. In either case, in response to such a request, an auto admin instance 350 may be configured to invoke an external workflow manager process to carry out the backup and restore operations (e.g., to coordinate, control, and monitor progress of these operations).

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

Note that in various embodiments, the components illustrated in FIGS. 4A-4C may be implemented directly within computer hardware, as instructions directly or indirectly executable by computer hardware (e.g., a microprocessor or computer system), or as a combination of these techniques. For example, these components may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white" }, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated. In some embodiments, secondary indexes may be added and/or modified during a restore operation, as specified in a request to restore a table.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report or in response to changes in various table or partition configuration parameters specified in a request to perform a restore operation). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments, additional control plane APIs supported by the service may be used to initiate and/or control backup and/or restore operations for various tables and the partitions thereof. For example, the service may support methods that initiate an asynchronous process to back up a specified table (e.g., a CreateBackup API), that initiate an asynchronous process to restore a table from a specified backup (e.g., a RestoreBackup API), that list the available backups (e.g., a ListBackups API), that return backup-related information about a specified backup (e.g. a DescribeBackup API), or that delete a specified backup (e.g., a DeleteBackup API).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

In some embodiments, the system described herein may be configured to create and execute a database instance in a single-tenant environment on dedicated hardware (e.g., on a dedicated storage device) or on particular ones of the storage nodes in the system. In other embodiments, a database instance in a single-tenant environment may be created and may execute on a different virtual machine in a storage node than other database instances that are created and that execute on the same storage node. In some embodiments, the underlying software and/or hardware to implement the functionality for performing database operations that target tables in both types of environments (e.g., operations to store, retrieve, or delete data) may be the same (or substantially similar). However, since clients may be able to directly connect to database instances (and/or tables therein) in the single-tenant environment, there may not be a need for the system to provide an intermediate layer to provide security or other utilities required to support multi-tenancy. Instead, authentication checks may be skipped and clients may submit requests to perform operations on these tables directly to the underlying storage node(s), e.g., on a low-latency path.

In some embodiments, a client may submit a request to create a database instance (e.g., using a CreateDatabaseInstance API), and may submit a request for a description of a database instance (e.g., using a DescribeDatabaseInstance API), in response to which, the system may return a list of IP addresses at which the client may directly connect to the database instance (or a table therein) to perform various operations (e.g., create table, put item, get item, etc.). In general, a database instance in a multi-tenant environment may store tables (or partitions and/or partition replicas thereof) for multiple different customers that all run within the same database instance. Therefore, the system may be required to keep clients from being able to access each other's tables using various security and authentication schemes. However, with a dedicated database instance in a single-tenant environment, the client may be given a specific IP address for the specific database instance, after which the client may configure a firewall group or another type of security group to limit the clients that are able to connect to that instance and/or create their own network connection to their table(s), e.g., a TCP connection that conforms to one of various open source protocols, in some embodiments.

In various embodiments, the systems described herein may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by the system in order to provide services requested by various clients. For example, in order to satisfy a service request directed to a data storage system, a data storage system may allocate one or more database connections, input/output channels, storage resource portions and/or other resources for each normalized, logical work unit or logical service request unit required to satisfy the request. In some embodiments, the systems described herein may include a Web service interface, an admission control subsystem for use in a multi-tenant environment, a service request subsystem for managing requests directed to tables in a multi-tenant environment, and a service request subsystem for managing requests directed to tables in a single-tenant environment. The Web services interface may be configured to receive requests for services from various clients and to communicate with the admission control subsystem to facilitate the performance of those services on behalf of the clients. For example, in some embodiments, the admission control subsystem may be configured to determine which and/or how many service requests that are directed to tables in a multi-tenant environment to accept from various clients, and may communicate with the appropriate service request subsystem to accept and/or service one or more received service requests. In some embodiments, the maximum request rate may be dynamically adjusted dependent on the current work throughput rate and/or a target or committed work throughput rate. In other embodiments, service requests may be managed using work-based tokens. If a service request is accepted for servicing by the admission control subsystem, the appropriate service request subsystem may in turn be configured to allocate (or initiate allocation of) one or more resources needed to perform the requested services to those requests, and/or to return results to the client via the Web services interface.

Various techniques that may be implemented by a Web server (or various components thereof) are described in more detail below, according to different embodiments. In general, any or all of the techniques described herein for managing the processing of service requests on behalf of clients and/or the management of tables, partitions, and replicas (including backup and/or restore operations) may be performed by and/or implemented in a module that is a component of a Web server. While several examples described herein are directed to systems that provide services over the Internet, in other embodiments, these techniques may be performed by and/or implemented by various components of another type of system that provides services to clients, and that is configured to receive, accept, and/or service requests on behalf of those clients.

Figure 5:
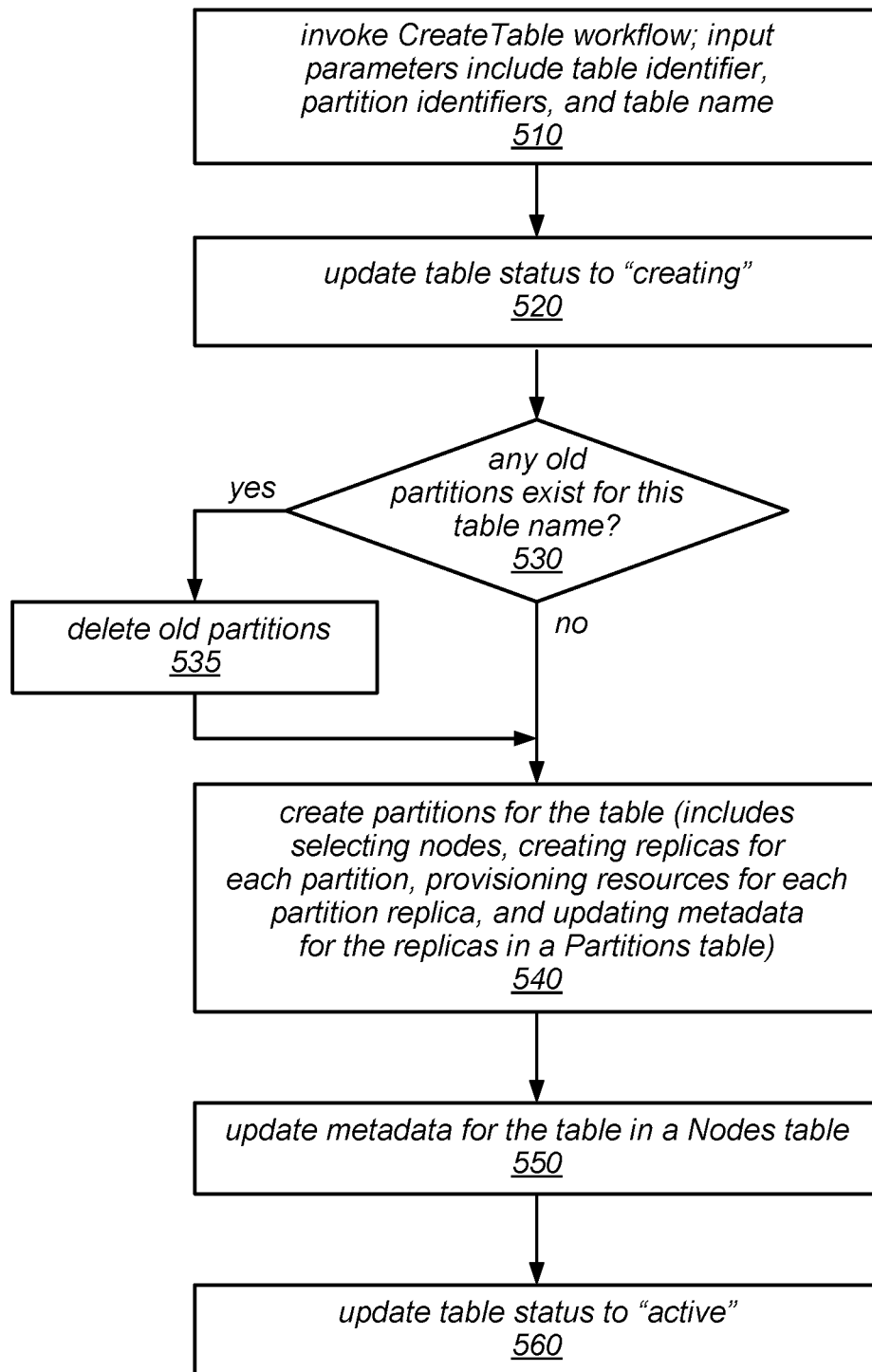
FIG. 5 is a flow diagram illustrating one embodiment of a workflow for creating a table.

As previously noted, a system that is configured to implement the data storage service described herein may rely on one or more workflows that are executed using an external workflow service. FIG. 5 illustrates one embodiment of such a workflow for creating a table. As illustrated at 510, the method may include invoking the CreateTable Workflow (e.g., in response to a request to create a table and subsequent to generating metadata for the new table). As illustrated in this example, in some embodiments, the table name, table identifier, and/or partition identifiers may all be passed to the CreateTable workflow as inputs to that process. Note that this (and/or any other service requests described herein) may include an input parameter identifying a particular subscriber, such as an accountID parameter. In such embodiments, the value of this input parameter may be passed to any workflows invoked in response to receiving the service request (e.g., the CreateTable workflow).

In some embodiments, a CreateTable workflow may allocate one or more partitions for a new table, create two or more replicas each for the partitions, and update the appropriate metadata in response to creating the table. One embodiment of such a workflow is illustrated by the flow diagram in FIG. 5. The workflow may be intended to be self-healing, in some embodiments. In such embodiments, if the process fails before completion, the whole workflow may be rerun one or more times until it succeeds. For example, each of the operations illustrated in FIG. 5 may be retried again and again in response to a failure. Note that in this example, it is assumed that the workflow is invoked only after determining that no active table exists that has the specified table name.

As illustrated in this example, the workflow may include updating the status of the table to "Creating" to reflect the fact that a workflow is currently working to create the table, as in 520. In some embodiments, the table status may be atomically updated to "Creating". In such embodiments, if multiple workflows attempt to perform this same table creation operation, only one will succeed, thus allowing the system to avoid a race condition, in this case. The workflow may also include determining whether any old partitions exist that include the table name specified for the new table, as in 530. For example, if a creation operation specifying this table name has been attempted (and failed) in the past, there may be remnant partitions remaining in the system that should be deleted before proceeding with the rest of the CreateTable workflow. In some embodiments, the workflow may include querying metadata (e.g., the Tables table) for any partitions associated with this table name. For example, there may be remnants of a previous failed attempt to create a table with this table name in the system, including metadata for the table in one or more metadata tables. For each partition found, there may be multiple replicas, and each of these replicas may be physically deleted from the storage nodes on which they reside, as in 535.

If no partitions associated with the specified table name are found (e.g., if this table creation operation has not been previously attempted and failed), shown as the negative exit from 530, or once such remnants have been deleted, the workflow may create one or more partitions for the new table, as in 540. As previously described, in some embodiments, the number of partitions created may be based on user input, historical data, and/or system-wide, client-specific, or application-specific defaults. As illustrated in FIG. 5, creating partitions for the new table may include selecting nodes on which to store multiple replicas of each of the partitions, creating the multiple replicas (which may include provisioning storage resource capacity and/or throughput capacity for each replica of each of the partitions), and updating the partition metadata (e.g., updating a "Partitions table" to include the newly created replicas and to indicate their locations). In some embodiments, selecting the nodes on which to store the replicas may include querying metadata to discover healthy nodes on which replicas can be stored, and allocating replicas to various ones of the healthy nodes using any of a variety of suitable allocation algorithms. In some embodiments, the system may support two or more flexible and/or pluggable allocation algorithms, including, but not limited to, selecting the nodes that have the most available storage space, selecting the nodes experiencing the lightest workload (e.g., the nodes receiving the fewest service requests), or selecting nodes at random (which may minimize a herding effect in which all new partitions go to the most lightly loaded nodes). Note that various methods for selecting the nodes on which replicas can be are described in more detail below, according to different embodiments.

As illustrated in FIG. 5, the CreateTable workflow may include updating node related metadata for the newly created table (e.g., in a "Nodes table"), as in 550. For example, the workflow may include reading all of the node locations of the newly created replicas from the Partitions table (which was updated in 540), and adding each of the newly created replicas to the appropriate entries of the Nodes table. Once the table's partitions (and their replicas) have been created, and the appropriate metadata has been updated to reflect the creation of the new table, the workflow may include updating the status of the newly created table to "Active", as in 560. In some embodiments, updating the status of the newly created table to "Active" may include decrementing a count of the number of tables that are in the "Creating" state in the Subscribers table described above.

Figure 6:
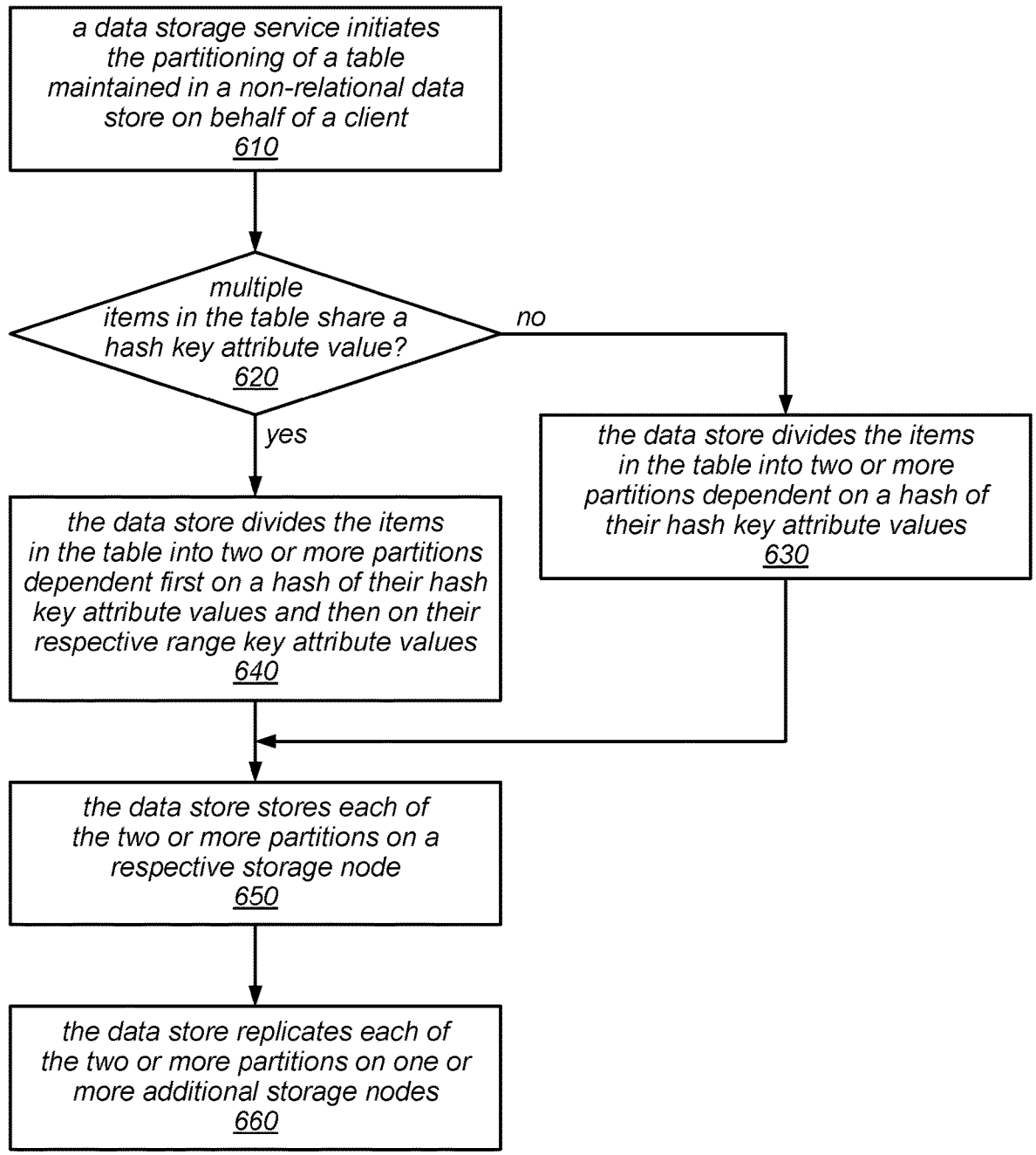
FIG. 6 is a flow diagram illustrating one embodiment of a method for partitioning a table maintained in a non-relational data store.

As previously noted, in embodiments in which the primary key is a simple key, the item in a table being maintained on behalf of a storage service client may be partitioned using a hash of the primary key value of each of the items, while in embodiments in which the primary key is a composite key, the data may be partitioned first by a hash of the hash key component, and then by the range key component. FIG. 6 illustrates one embodiment of a method for partitioning table data using simple and/or composite keys, according to one embodiment. As illustrated at 610, in this example, the method may include a data storage service (or a component of the underlying system that implements a data store, such as a storage node instance or administrative component) initiating the partitioning of a table maintained in a non-relational data store on behalf of a storage service client.

If multiple items in the table share a hash key attribute value, shown as the positive exit from 620, the method may include the data store dividing the items in the table that have a given hash key attribute value into two or more partitions (e.g., database partitions) dependent first on a hash of their range key attribute values, and then on their range key attribute values, as in 640. In other words, if the primary key for the table is a composite key that includes hash key component whose values may be used to identify a group of items and a range key component whose values may be used to order items having the same hash key attribute values and uniquely identify each of those items, both the hash key attribute value and the range key attribute value may be used to partition the items in the table. For example, for a group of items that have the same hash key attribute value, the first n items in the group (when ordered by their respective range key attribute values) may be assigned to one partition, the next m items in the group may be assigned to a second partition, and so on. Note that in some embodiments, each partition may include a portion of the items sharing one hash key attribute value and may also include other items having other hash key attribute values.

If none of the items in the table share a hash key attribute value, shown as the negative exit from 620, the method may include the data store dividing the items in the table into two or more partitions dependent on a hash of their respective hash key attribute values, as in 630. For example, if the primary key for the table is a simple key that includes hash key component whose values may be used to uniquely identify each of the items in the table, the items in the table may be partitioned (i.e. assigned to one of a plurality of partitions) dependent a hash of the hash key attribute value, but not dependent on any other item attribute values. In some embodiments, if the primary key is a composite key, but none of the items in the table share a hash key attribute value (i.e. if each item has a unique hash key attribute value), the data store may partition the items as if the primary key were a simple key (i.e. it may partition the items in the table using the hash key attribute value alone).

Once the data store has assigned all of the items to a partition, the data store may store each of the partitions on a respective storage node (e.g., a respective computing node or storage device), as in 650, which may include provisioning storage resource capacity and/or throughput capacity for each of the partitions on their respective storage nodes. In some embodiments, each partition of a single table may be stored on a different storage node, while in other embodiments two or more of the partitions may be maintained on the same storage node. Note that various methods for selecting the nodes on which the partitions are stored are described in more detail below, according to different embodiments.

In various embodiments, each of the resulting partitions may be replicated one or more times in the data storage system, as in 660, which may include provisioning storage resource capacity and/or throughput capacity for each of the replicas on respective storage nodes. Various methods for selecting the node on which each of the partition replicas is stored are described in more detail below, according to different embodiments. Note that in some embodiments, the number of partitions into which the items of a given table are partitioned may be pre-determined (e.g., it may be based on user input/preferences, or historical data for a client, account, or table type), while in other embodiments, the number of partitions into which the items of a given table are partitioned may be determined as the partitioning operation progresses, e.g., based on the number of items in each range of hash results and/or the number of items in each range of range key attribute values. Note also that because the partitioning is based on a hash result, the order in which groups of items may be assigned and distributed among the available partitions may be somewhat randomized. In some cases, e.g., if some items are accessed much more frequently than others or some groups of items include a higher number of items than others, an initial partitioning may result in hot spots. In such cases, a partition management operation (e.g., a partitioning splitting operation or a partition moving operation) may be performed in order to more evenly distribute the items among the available partitions (e.g., with respect to data volume and/or service request traffic). Note also that in some embodiments, the items in a table may be partitioned using a single hash key component and two or more range key components.

In one example of the partitioning of items in a given table, the hash key attribute is a "User name" attribute, and the range key attribute is a "Message ID" attribute. In this example, the given table stores multiple messages associated with each of three user names (Bob, Sue, and Phil). In this example, some partitions of the given table may include only items having the same hash key attribute value. In this example, a partition identified by a Partition ID value of A may store only messages having the hash key attribute value "Bob". Note that this partition may not store all of Bob's messages, but only messages having Message ID values (i.e. range key attribute values) 1-199. Another group of Bob's messages (those with range key attribute values 200-299) may be stored in a partition identified by a Partition ID value of B. This partition may also store messages having a hash key attribute value of "Sue", specifically, those messages having range key values of 1-50. Yet another group of Bob's messages (those with range key attribute values 300-399) may be stored in a partition identified by a Partition ID value of C. This partition may also store messages having a hash key attribute value of "Phil", specifically, those messages having range key values of 1-100.

In this example, a request to retrieve all of Bob's messages may retrieve messages 1-199 from partition A (which may be maintained on a particular storage node), messages 200-299 from partition B (which may be maintained on a different storage node), and messages 300-399 from partition C (which may be maintained on yet another storage node). In some embodiments, a request to retrieve all of these messages may be terminated early (e.g., if response limit is reached), and the remaining messages may be retrieved in response to a subsequent request.

As previously noted, in some embodiments, the data storage service (and/or underlying system) described herein may provide two different APIs for searching the data maintain in tables on behalf of storage service clients: a Scan API and a Query API. In some embodiments, the Scan API may be used to request an operation that scans an entire table. A Scan request may specify one or more filters to be applied to the results of the scan operation, e.g., to refine the values returned to the requestor following the complete scan. In some embodiments, the Query API may support comparison operations to limit the search process to the data that matches the supplied query conditions (e.g., conditions on the attributes of the items). For example, a Query request may be used to find all the data in a table that matches the parameters specified in the request, up to a pre-defined limit (if such a limit is imposed by the system).

In various embodiments, a Scan API may be used to retrieve one or more items and attributes stored in a table on behalf of a storage service client by performing a full scan across the table. The items returned may be limited by specifying a filter. In some embodiments, the Scan API may support richer semantics than the Query API described above. For example, it may support comparison operators such as "CONTAINS", "IS NULL", "IN", etc.

In some embodiments, any or all of the metadata described herein as being used in maintaining and managing tables on behalf of a data storage service client (including any metadata tables described herein) may be stored in the same scalable data store (e.g., the same non-relational database) as that in which the client/user tables are stored. For example, various computing nodes may store user data (e.g., in tables maintained on behalf of a user) and/or system data, including metadata used by the data storage service, such as that described above. Therefore, each node of the data model for such a system may include an indicator of the type of the node. For example, in one embodiment, each node may be designated as a "storage node", a "request router", an "auto-admin" node, or a "staging" node. In some embodiments, a "storage node" may store user data in one or more tables maintained by the data storage service, but metadata (e.g., data stored in one or more of a Tables Table, a Subscribers Table, a Partitions Table, or a Nodes Table) may be hosted on other types of nodes (e.g., "auto admin" nodes and/or "staging" nodes). In other embodiments, such metadata may be stored on one or more "storage nodes", some of which may also store user data. Each node may also include an identifier of the node, and one or more other elements. In some embodiments, information about each replica may be represented in the data model, and each replica in the data model may include an identifier of the node on which the replica is hosted, and one or more partition identifiers indicating the partitions included in those replicas. For example, each partition may be represented in the data model as a partition element, which may include its partition-id. In various embodiments, each node may host multiple replicas, and each partition may be included in multiple replicas.

In various embodiments, there may be situations in which a partition (or a replica thereof) may need to be copied, e.g., from one machine to another. For example, if there are three replicas of a particular partition, each hosted on a different physical or logical machine, and one of the machines fails, the replica hosted on that machine may need to be replaced by a new copy (replica) of the partition on another machine. In another example, if a particular machine that hosts various replicas of multiple partitions of one or more tables experiences heavy traffic, one of the heavily accessed partition replicas may be moved (e.g., using a copy operation followed by an operation to redirect traffic) to a machine that is experiencing less traffic in an attempt to more evenly distribute the system workload and improve performance. In some embodiments, the data storage service (and/or underlying system) described herein may perform replica moves and/or replica copying using a physical copying mechanism (e.g., a physical file system mechanism) that copies an entire partition replica from one machine to another, rather than copying a snapshot of the partition data row by row (as in a traditional logical database partition copying operation).

In some embodiments, all write operations may be logged before being applied to a particular partition (and/or various replicas thereof), and they may be applied to the partition (i.e. to the replicas thereof) periodically (e.g., in batches). In such embodiments, while a partition replica is being copied, write operations targeting the partition may be logged. During the copy operation, these logged write operations may be applied to the partition at periodic intervals (e.g., at a series of checkpoints). Once the entire partition has been copied to the destination machine, any remaining logged write operations (e.g., any write operations performed since the last checkpoint, or any write operations that target portions of the partition that were copied to the destination prior to those write operations being logged) may be performed on the destination partition replica by a final catch-up process. In some embodiments, the catch-up process may examine the sequentially ordered write operations in the log to determine which write operations have already been applied to the destination partition replica and which, if any, should be applied to the destination partition replica once the physical copying of the partition data is complete. In such embodiments, unlike with traditional partition copying or moving mechanisms, the data in the destination partition replica may be consistent following the completion of the operation to move/copy the partition replica.

As noted above, the data storage systems described herein may support transactions that are directed to the tables stored in databases, each of which may include multiple write operations. In some embodiments, each transaction may be associated with a log sequence number (LSN). In some embodiments, the log identifier associated with each of the transactions may be unique among the log identifiers associated with transactions directed to the same one of the partitions, and the log identifiers associated with transactions directed to the same one of the partitions may constitute an ordered sequence of log identifiers for the partition. For each transaction, either all of the write operations of a transaction may be committed to the table or none of them. In some embodiments, a partition backup may be guaranteed to reflect the application of all of the write operations of the transactions received prior to the request to back up the table (e.g., up to a particular LSN). There may be no guaranteed that the write operations of any transactions received after a backup was requested, but the system may guarantee that no partial transactions are reflected in the backup (e.g., where some, but not all, of the write operations in a single transaction are applied to the copy of the partition that is uploaded to the remote storage system).

In some embodiments, when backing up a database table, the system may be configured to apply to each of the partitions all of the write operations of transactions directed to the partition and received prior to receiving the request to back up the table such that all transactions associated with log identifiers in the ordered sequence of log identifiers for the partition up to and including the transaction associated with a given log identifier (e.g., the most recently received transaction that was received prior to receiving the request to back up the table) in the ordered sequence of log identifiers for the partition are guaranteed to have been applied to the partition. In some cases, the write operations of one or more additional transaction may also be backed up, e.g., if they are directed to a partition that is backed up later in the overall table process. For example, if a backup is requested at time t, the system may wait for all transactions that were received up to time t−1 to be applied to the partitions to which they are directed, and then perform the backup operation. By this time, for some partitions, one or more additional transactions that were received after time t may have already been applied and, thus, may be reflected in the copy of the partition that is backed up.

In some embodiments, requests for a backup may be received by and/or routed to the master replica for each replica group. However, in various embodiments, the backup may be taken from the master replica in a replica group or by another replica in the group (e.g., the master replica for a partition or a slave replica for a partition may serve as the source for the partition backup), but for a given partition, the backup may be relative to a particular LSN. In such embodiments, if a partition backup is being sourced from a slave replica, the slave replica may not be uploaded to the remote storage system until after all of the transactions up to the particular LSN have been applied to the slave replica. In some embodiments, the master replica may wait for an indication from the slave replicas that all of the transactions up to the particular LSN have been applied to the slave replicas before proceeding with the partition backup.

In some embodiments, while writes to a single partition may be totally ordered (e.g., by their associated LSNs), there may be no global LSN sequence in the data storage system for an entire table. Since writes to different partitions can happen out of order (e.g., in an order different than the order in which they were received by the data storage system) and cannot be included in a single transaction, some may succeed while others fail. As previously noted, different partitions of the same table may be backed up in parallel (e.g., substantially concurrently, but not necessarily in sync) in some embodiments.

Figure 7:
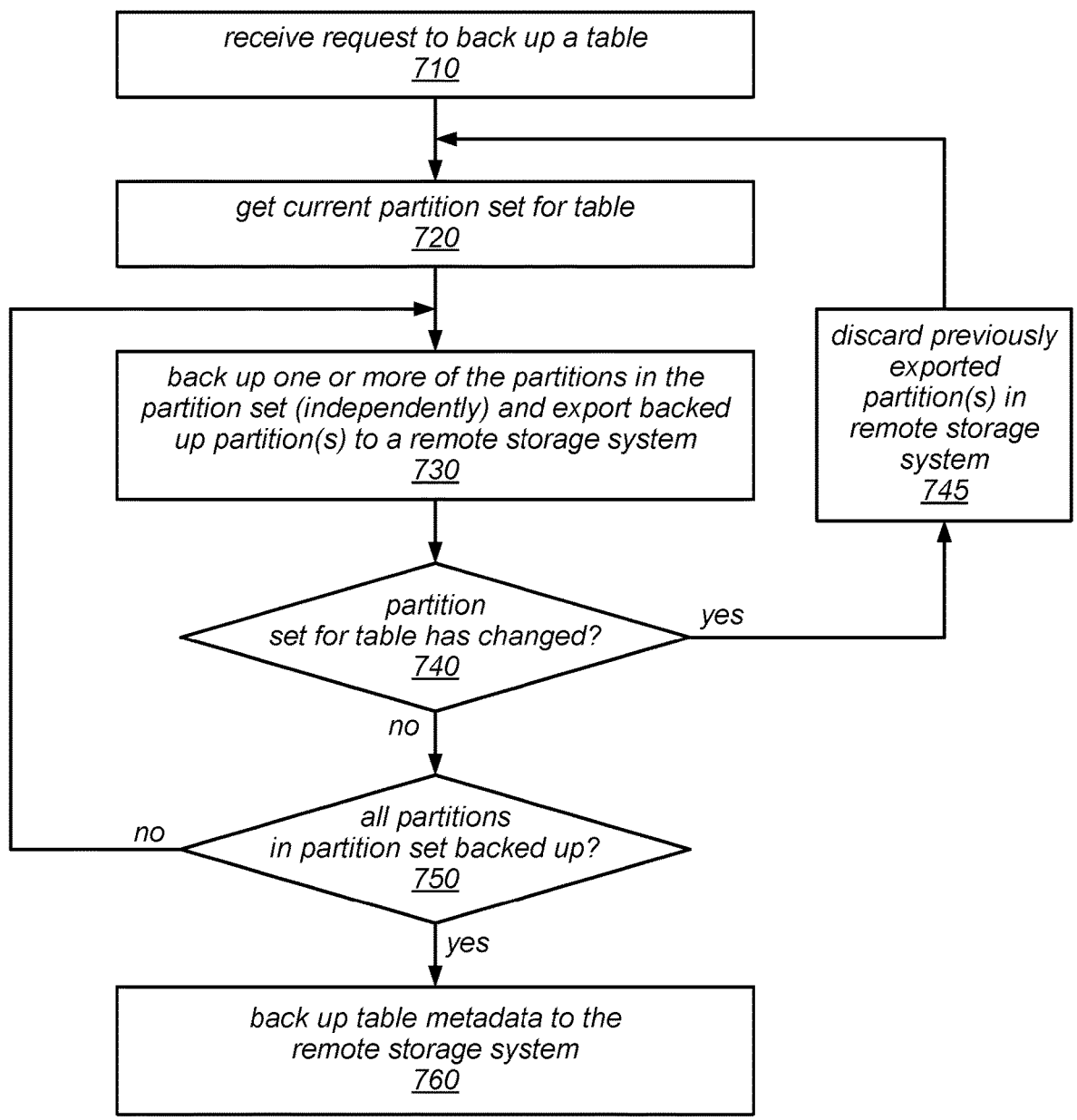
FIG. 7 is a flow diagram illustrating one embodiment of a method for backing up a table that includes a set of one or more partitions.

One embodiment of a method for backing up a table that includes a set of one or more partitions is illustrated by the flow diagram in FIG. 7. As illustrated at 710, in this example, the method may include receiving a request to back up a table. In response to the request, the method may including getting a current partition set for table (e.g., retrieving stored metadata and/or other information about the partitions that store data for the table), as in 720. The method may include beginning to back up each of the partitions in the partition set (independently) and to export them (e.g., to export copies of each of them) to a remote storage system (e.g., a remote key-value durable storage system or another type of remote storage system suitable for storing backup copies of the partitions such that they can be subsequently restored), as in 730. In some embodiments, two or more of the partitions may be backed up in parallel (i.e., substantially concurrently), but those backup operations may or may not take the same amount of time. In other embodiments, some or all of the partitions may be backed up sequentially. Therefore, in various embodiments, the backup operations for different ones of the partitions may be completed at different times.

Note that in some cases, the current set of partitions for a table may change while the table is being backed up. For example, while an individual partition may not be reconfigured (e.g., split, moved, or merged with another partition) while that partition is being backed up, in some embodiments, one or more partitions that were included in the partition set for the table at the time the backup request was received (or at the time the partition set list was obtained in response to receiving the backup request) may be deleted, split into two or more new partitions, moved, or merged with another partition subsequent to the initiation of the backup operation for the table but prior to the individual partition itself being backed up. As illustrated at 740, in this example, the method may include (during the backup operation) determining whether the partition set for the table (e.g., the set of partitions in which data for the table is stored) has changed. In some embodiments, this may include determining whether there are any overlaps between the items currently stored in the partitions or gaps in the items currently stored in the partitions following the performance of any operations that targeted the table since the partition list for the table was most recently obtained. For example, each partition may store items having keys in a particular range (e.g., between a particular start key value and a particular end key value for the partition). If it is determined that, as a result of an operation performed on the table since the list of partitions was obtained, two or more of the partitions on the previously obtained partition list store items in overlapping key ranges or some items in the table are no longer being stored on any of the partitions on the previously obtained partition list, the system may be configured to re-start the backup operation with a more current list of partitions for the table in an attempt to resolve such issues.

As illustrated in FIG. 7, if the partition set for the table has changed since the initiation of the backup operation (e.g., after the partition set list was initially obtained) the method may (in at least some embodiments) include discarding any previously exported partition(s) in the remote storage system and re-starting the backup operation. This is illustrated in FIG. 7 by the feedback from the positive exit of 740 to 745 and then to 720. On the other hand, until or unless it is determined that the partition set for the table has changed, the method may include continuing to back up and export each of the partitions in the current partition set (independently) until all of them have been backed up and exported. This is illustrated in FIG. 7 by the feedback from the negative exit of 750 to 730. However, if at any point during the backup operation for the table, it is determined that the partition set for the table has changed (e.g., one or more times over the course of the backup operation), the method may include re-starting the backup operation, as described above. Once all of the partitions in the partition set have been backed up (shown as the positive exit from 750), and it has been determined that the partition set has not changed since the backup operation was initiated (or since the last time the backup operation was re-started), the method may include backing up metadata for the table to the remote storage system, as in 760. As described in more detail herein, the metadata may include information relevant to the entire table as well as partition-specific metadata, in various embodiments.

In various embodiments, some or all of the backup-related metadata elements described herein may be utilized by different ones of the control plane APIs (including backup operations, restore operations, and cross region backup/restore type operations). For example, the CreateBackup, CopyBackup, and DeleteBackup APIs may need to know if a particular backup exists (e.g., a backup with a particular BackupID); the DescribeBackup API may need to know some or all of the customer-visible details about the backup; and the ListBackups API may need to be able to list backup tables by backup request times (e.g., the times at which the backups were initiated) and/or by table and backup creation times (e.g., the times at which the backups were completed). In addition, the DescribeTable API may need to be able to list information about the last backup that was successfully performed on the specified table. Therefore, in some embodiments, this information may be stored in the Tables table described above. Similarly, some or all of the backup-related operations may need to access the Subscribers table described above (e.g., from the request routers). Therefore, in some embodiments, the Subscribers table be configured to be able to hold inflight data for these operations.

In some embodiments, the BackupID for a given backup may stay the same when it is copied to another region. In some such embodiments, the BackupID may be unique across all regions. For example, in some embodiments, uniqueness within a region may be largely assured using only UUIDs for BackupID values (by looking up metadata tables), but this approach may not guarantee uniqueness across regions. Therefore, in some embodiments, each BackupID may include two parts, a UUID portion and RegionID portion, where the RegionID portion indicates the region in which the backup was created.

In general the backup-related metadata that may be created, stored, used, and/or updated by various backup and restore operations may include any or all of the following:

Information about the backup (e.g., time at which the backup was requested, the time at which it was completed, the size of the backup and/or the items in the backup, etc.).

Information about the table (e.g., schema, indexes, etc.), which may be used at restore time to create a new table metadata record.

Information about each partition (e.g., the format(s) in which they were stored, the size of the file uploaded into the remote storage system, an MD5 checksum or another type of checksum for the partition, the hash key start value for the partition, the hash key end value for the partition, etc.).

Note that, in some embodiments, only backup metadata itself (i.e., the information about the backup described in the first bullet above) may be visible to customers and may need to be fetched from the request routers. In some embodiments, that information may be stored in metadata tables in the distributed data storage system (e.g., in various system tables described herein). In some embodiments, the rest of the information may be stored in the remote data storage system. As noted above, in some embodiments, the Tables table may be configured to store information about the last backup that was successfully performed on each table (e.g., the time at which the last successful backup was requested, the BackupID for the last successful backup, and the BackupID from which the table was restored, if any.

Figure 8:
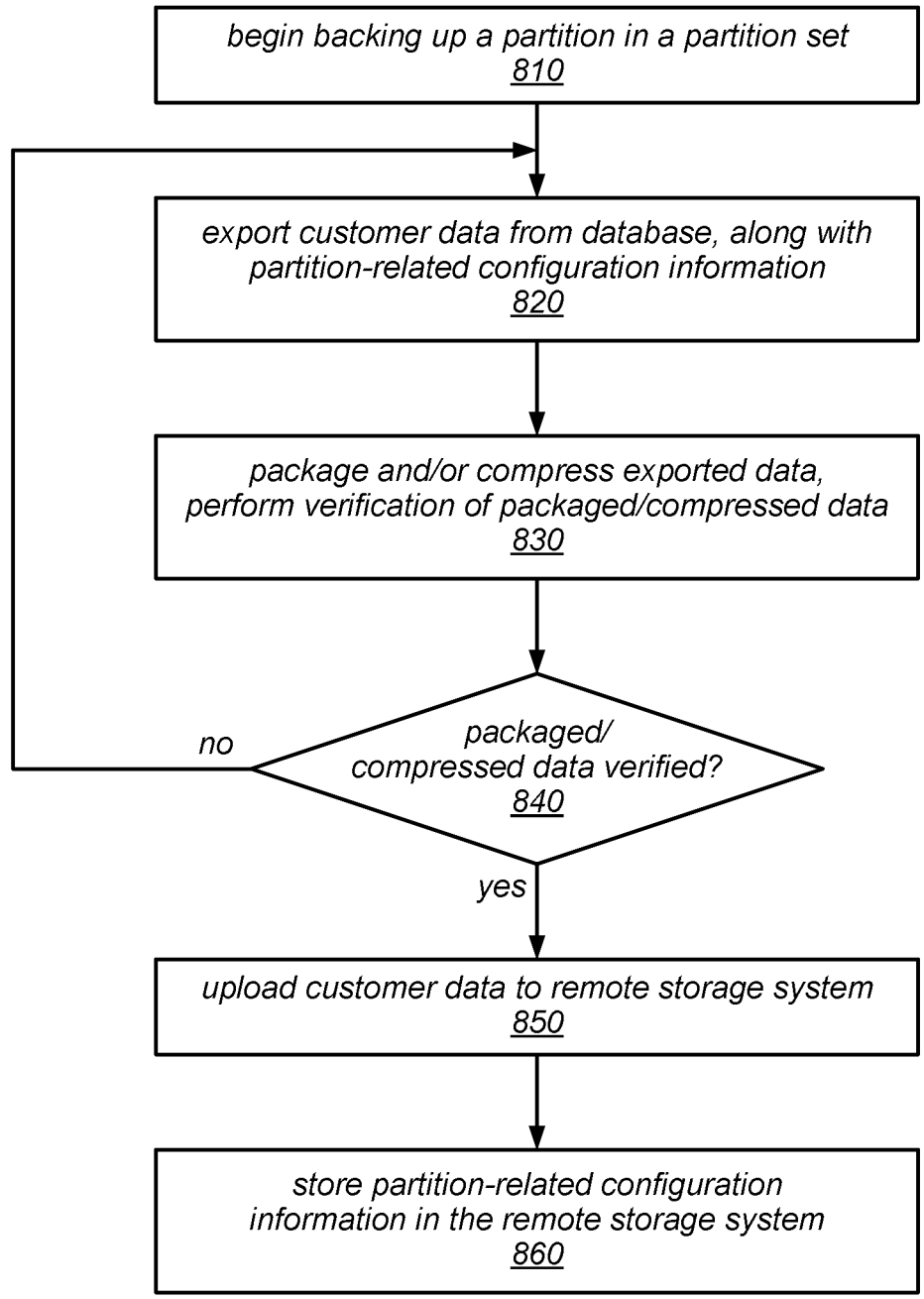
FIG. 8 is a flow diagram illustrating one embodiment of a method for backing up one of a set of partitions of a table.

One embodiment of a method for backing up one of a set of partitions of a table is illustrated by the flow diagram in FIG. 8. As illustrated in this example, the method may include beginning to back up a partition in a partition set (as in 810), and exporting customer data in the partition from the database in which the table is stored, along with partition-related configuration information (as in 820). In some embodiments, the partition-related configuration information may include a partition identifier, a list of the members of the replica group for the partition, the key schema for the partition, an indication of the partition boundaries, and/or an identifier of the last transaction and/or write operation that was applied to the customer data in the partition (e.g., a log sequence number associated with the transaction or write operation).

As illustrated at 830, in this example, the method may include packaging and/or compressing the exported data, and performing a verification operation for the packaged and compressed data (e.g., to verify that the exporting, packaging and/or compressing operations did not corrupt the data and/or to verify that the exported, packaged, and compressed partition can be subsequently restored). Various methods for performing such a verification operation (some of which include re-inflating the exported, packaged, and compressed partition and/or comparing checksums for the re-inflated partition and the original partition) as described in more detail herein. If the exported, packaged, and compressed partition data is not successfully verified (shown as the negative exit from 840), the method may include repeating the exporting, packaging and/or compressing operations one or more times (e.g., until the exported, packaged, and compressed partition data is successfully verified or until a pre-determined maximum number of unsuccessful attempts have been made). This is illustrated in FIG. 8 as the feedback from the negative exit of 840 to 820. In some embodiments, the method may include returning an error if the exported, packaged, and compressed partition data is not successfully verified after a pre-determined maximum number of attempts (not shown).

As illustrated in this example, once the exported, packaged, and compressed partition data has been verified (shown as the positive exit from 840), the method may include uploading customer data in the partition to a remote storage system, as in 850, and storing partition-related configuration information in the remote storage system, as in 860. In some embodiments, the partition-related configuration information may be stored as an individual item in the remote storage system (e.g., in a different object than that in which the customer data in the partition is stored). In some embodiments, the partition-related configuration information may be stored along with metadata and/or other information about the table (which may include similar information about one or more other partitions in the partition set). In other embodiments, the partition-related configuration information may be stored along with the partition data (e.g., in the same object).

In some embodiments, an uploader process or component that is configured to upload each of the partitions to the remote storage system may assume that the items to be uploaded (e.g., copies of the partitions) have been packaged in a compressed data file that is ready for upload. The uploader may employ a multi-part upload that allows concurrent buffering of the file, generating (or re-generating) a checksum after each chunk, and uploading each chunk to the remote storage system (with one or more retry attempts allowed following a checksum mismatch or another type of failure). An upload request may take the checksum of the entire file as an input and use that for verification of the correctness of the backup object (e.g., to verify that the file being uploaded has not been corrupted).

In some embodiments, the correctness of the backup object may be verified by re-importing it into the data storage system after packaging to ensure that it can be subsequently restored. In some embodiments, verification of the correctness of the backup object may be done by adding an additional replica to the replica group for the partition using the backup object. In some such embodiments, verification of the correctness of the object may include attempting to apply one or more changes to the additional replica (i.e. the replica created from the backup object), including any changes that were received, applied, and/or logged by one of the other replicas in the replica group during the backup operation. Note that upon uploading the backup object to the remote data storage system, the remote storage system to which the backup object is uploaded may store the backup object according to its own policies and/or mechanisms (e.g., it may upload each partition as multiple shards, according to an erasure coding scheme employed by the remote storage system).

In general, the backup processes described herein may protect against corruption by taking various measures at any or all of the steps of the process. For example, in some embodiments, the backup process for a partition may include exporting the partition from the database in which the table is stored to create a copy of the backup for uploading, packaging the exported copy of the partition (e.g., according to any of a variety of archiving formats), compressing the exported and packaged partition, and then uploading the exported, packaged, and compressed partition to the remote storage system as a single backup object. In some embodiments, to verify the correctness of the backup object, it may be uncompressed and/or unpackaged to create an uncompressed and/or unpackaged copy of the partition, and an MD5 checksum may be generated and compared against an MD5 checksum generated from the original partition copy to verify that the partition was not corrupted by the packaging and compression processes. In some embodiments, in order to verify that the backup object was not corrupted during the uploading process, the system may be configured to use the MD5 checksum of all the objects uploaded into the remote storage system (which may be optionally or automatically generated by the remote storage system) and the remote storage system may will verify that all the objects were uploaded correctly. In some embodiments, the backup process may include making a copy of each exported partition on another host before packaging, compressing, and uploading it (e.g., performing the packaging, compressing, and uploading of the copy on the other host, rather than on the source of the partition), while in other embodiments these operations may be performed on an exported copy of each partition on the host on which it was stored (e.g., the source of the partition). In some embodiments, one or more of the packaging, compressing, and/or uploading processes may include applying an encryption algorithm to the exported, packaged, compressed, and/or uploaded copy of the partition. For example, an encrypted communication protocol (e.g., HTTPS) may be employed when uploading the backup object to the remote storage system, in some embodiments, and/or the remote storage system may encrypt the backup objects after they are received and prior to (or as a part of) storing them.

Figure 9:
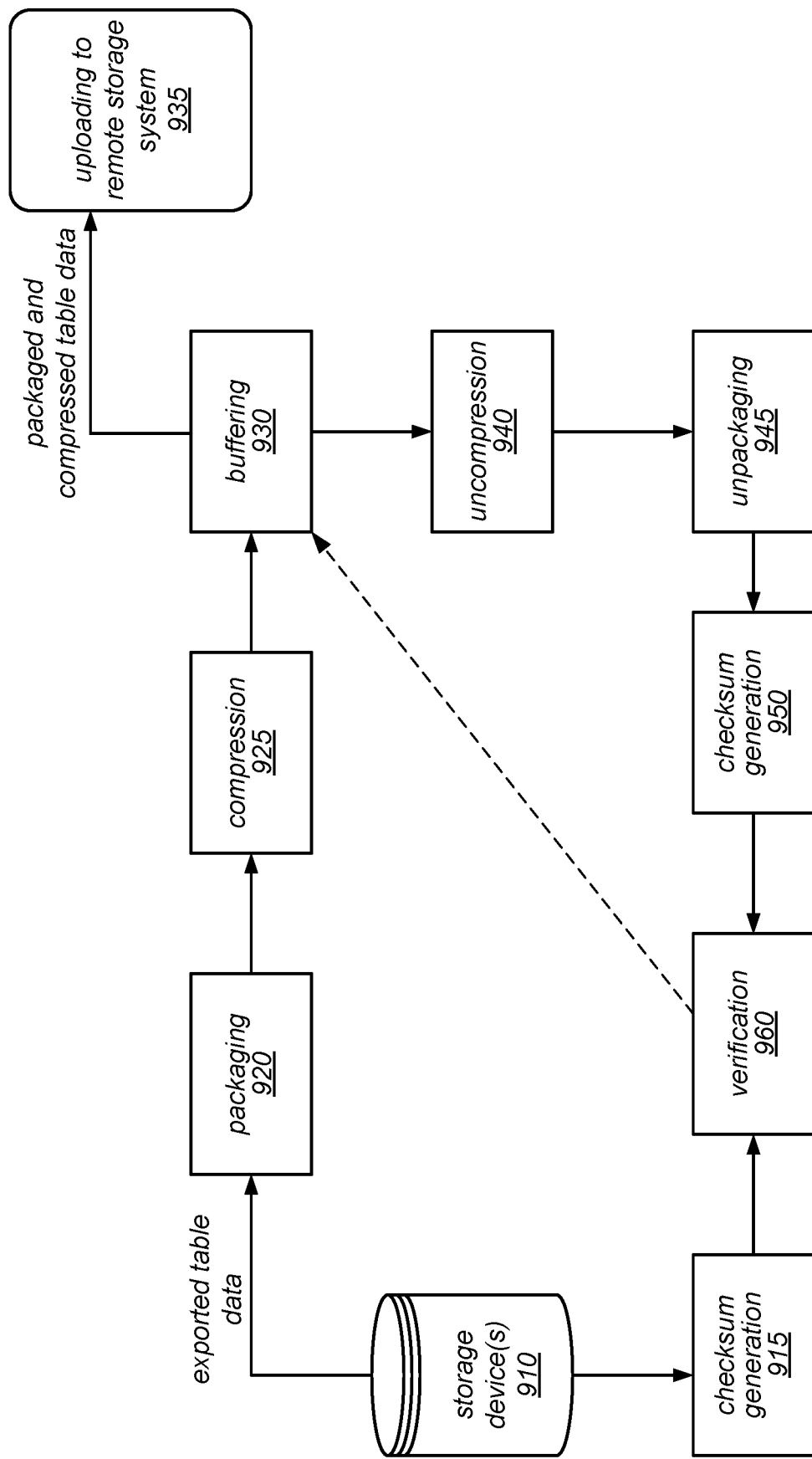
FIG. 9 is a block diagram illustrating an operation to back up a table to a remote storage system, according to one embodiment.

FIG. 9 is a block diagram illustrating an operation to back up a table (or, more specifically, a partition of a table) to a remote storage system, according to one embodiment. As previously noted, in some embodiments backup operations for multiple partitions of the given table may be issued independently and in parallel in response to a request to back up a table. In this example, storage device(s) 910 (which may include one or more physical storage devices or logical storage volumes of a storage node in a distributed, scalable data storage system) may store data in one or more database tables (and/or partitions thereof). For example, each storage device 910 may store one partition of a given table. As illustrated in this example, in response to a request to back up the given table, table data (e.g., table data for one of the partitions of the given table) may be exported and the exported table data may be packaged (as in 920). For example, the exported table data (e.g., an exported copy of the partition) may be re-formatted for compliance with an archiving format. As illustrated in this example, the packaged table data (e.g., the packaged copy of the partition) may then be compressed (as in 925), with or without encryption, and buffered (as in 930), at least until the correctness of the packaging and/or compression processes have been verified. In other words, in this example, before uploading the packaged and compressed table data to the remote storage system (as in 935), the packaging and compression operations may be verified (e.g., determined to be uncorrupted and/or otherwise usable in restoring the table data in a subsequent restore operation), as described herein.

In this example, verifying that the packaged and compressed table data is uncorrupted and/or is otherwise usable in restoring the table data may include uncompressing the table data (as in 940), unpackaging the uncompressed table data to return it to its previous format (as in 945), and generating a checksum for the uncompressed, unpackaged table data (as in 950). The verification process may include comparing this checksum with a previously generated checksum (shown in 915), as in 960. For example, the checksum shown as 915 may have been generated as part of the verification operation, or the checksum may have been previously generated and stored with the table data (along with other configuration information and/or metadata about the table and its partitions), in different embodiments.

In this example, if the checksums do not match, the packaged and compressed table data may be discarded (e.g., discarded from the buffer, rather than being exported) and the data storage system may be configured to re-initiate the backup operation for the table data (e.g., for this partition) one or more times. On the other hand, if the checksums match, the packaged and compressed table data may be considered verified, and the data storage system may continue the backup operation by uploading the table data to remote storage system 935 (which, in some embodiments, may be a remote key-value storage system). As illustrated in this example, if the verification is successful, an indication to that effect may be sent to the buffering operation/component to enable and/or initiate the uploading operation. This is illustrated in FIG. 9 by the dashed line from 960 to 930. Note that in some embodiments, exporting and uploading the table data may include exporting and uploading a previously generated checksum for each partition and storing it in the remote storage system (with the data or elsewhere in the remote storage system, in different embodiments). In some embodiments, some or all of the operations illustrated as 915, 920, 925, 930, 940, 945, 950, and/or 960 may be performed by an external workflow component that coordinates, controls, and monitors the backup process for one or more partitions of the given table.

In some embodiments, the process for restoring a table from a backup may include some of the same operations as the process for creating a table, as it may include creating a new table. However, instead of creating empty partitions for the new table, the partitions that were backed up may be imported into the partitions of the new table as part of the restore process. As was the case with the backup operations described herein, in some embodiments, the data storage systems described herein may perform restore operations on each individual partition (e.g., independently and in parallel) to create the new (restored) table. For example, in response to a request to restore a backup of a table, a new table may be created based (at least in part) on the stored backup information described above. Some of this information may be updated for the new table as part of the restore process. For example, the partition identifiers for each of the restored partitions may be changed and new replica groups may be formed, resulting in updated membership information for the new table and its partitions. Other ones of the metadata elements described herein for the table and/or for the restored partitions may be the same as those of the partitions that were backed up.

Figure 10:
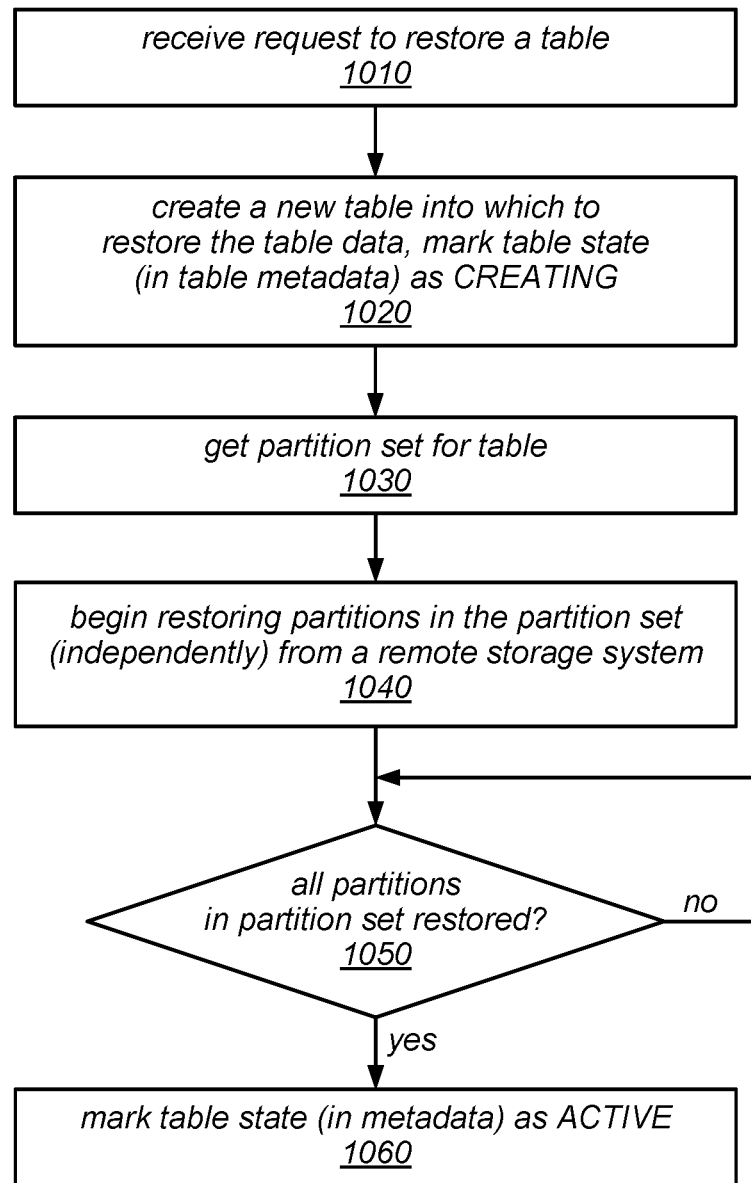
FIG. 10 is a flow diagram illustrating one embodiment of a method for restoring a table that includes a set of one or more partitions from a remote storage system in which it was backed up.

One embodiment of a method for restoring a table that includes a set of one or more partitions from a remote storage system in which it was backed up is illustrated by the flow diagram in FIG. 10. As illustrated at 1010, in this example, the method may include receiving a request to restore a table from a backup. In response to the request, the method may include creating a new table into which to restore the table data, and marking the state of the new table (e.g., in stored metadata for the new table) as CREATING, as in 1020. The method may include getting a partition set for table (e.g., retrieving stored metadata and/or other information about the partitions of the table), as in 1030, and beginning to restore the partitions in the partition set (independently) from a remote storage system (e.g., a remote key-value durable storage system) into which copies of each of the partitions were previously backed up, as in 1040.

In various embodiments, restoring the partitions may include importing two or more of the partitions into the new table from the remote storage system in parallel (i.e., substantially concurrently), but those import operations may or may not take the same amount of time. In other embodiments, some or all of the partitions may be imported into the new table from the remote storage system sequentially. Therefore, in various embodiments, the restore operations for different ones of the partitions may be completed at different times. As illustrated at 1050 in FIG. 10, the method may include waiting for all of the partitions in the partition set to be restored before proceeding. Once all of the partitions in the partition set have been restored (shown as the positive exit from 1050), the method may include marking the state of the new table (e.g., in the stored metadata for the new table) as ACTIVE (as in 1060), which may make the new table available to receive, accept, and service read and/or write requests directed to the new table.

In some embodiments, restoring a table from backup may include choosing a set of storage resources (e.g., physical storage devices or logical storage volumes on one or more storage nodes in the distributed data storage system) on which to create the new table (e.g., on which to import partitions and replicas thereof), downloading the backed up copies of the partitions of the table from the remote storage system, uncompressing and/or unpackaging the downloaded partition copies, and importing the uncompressing and/or unpackaged partition copies into corresponding partitions in the new table (which may include creating one or more replicas of each of the restored partitions). Selecting the nodes on which to create the new table may be performed using any of a variety of techniques, including, but not limited to, those described above, and may be dependent (at least in part) on the stored and/or updated metadata for the original table and/or the new table.

As previously noted, in some embodiments, the distributed data storage system may support an option to restore a table from a backup with different configuration parameters than those associated with the table from which the backup was created. For example, a request to restore a table from backup may include a new configuration parameter value for provisioned throughput capacity (e.g., in terms of IOPS for read and/or write operations) or for provisioned storage capacity, or may indicate a change in the indexing for the table (e.g., with modified or additional secondary indexes). For example, the indexing or the table may be changed to support more, fewer, or different reporting operations than those supported in the original table and/or in response to an anticipated change in the workload for the table.

In some cases, if the request specifies different throughput capacity (e.g., in terms of read and/or write IOPS) or storage requirements, the system may be configured to automatically (e.g., programmatically) perform one or more repartitioning operations to make better use of the available resources. For example, if the new configuration parameter value indicates an increase or decrease in storage capacity or throughput capacity, its application may automatically trigger a partition split, move, or merge operation, in some embodiments. In some embodiments, the new table may not be made available until after such automatically triggered repartitioning operations has been completed. In other embodiments, partitions may be restored using their original configuration parameter value (or using default configuration parameter values), the new table may be made available using those configuration parameter values, and the automatically triggered repartitioning operations made be performed later (e.g., using a background process) while the new table continues to receive, accept and/or service and/or write operations directed to the new table. In still other embodiments, a data storage system user may decide whether and/or when to initiate partition split, move, or merge operations in response to such configuration parameter value changes.

Figure 11:
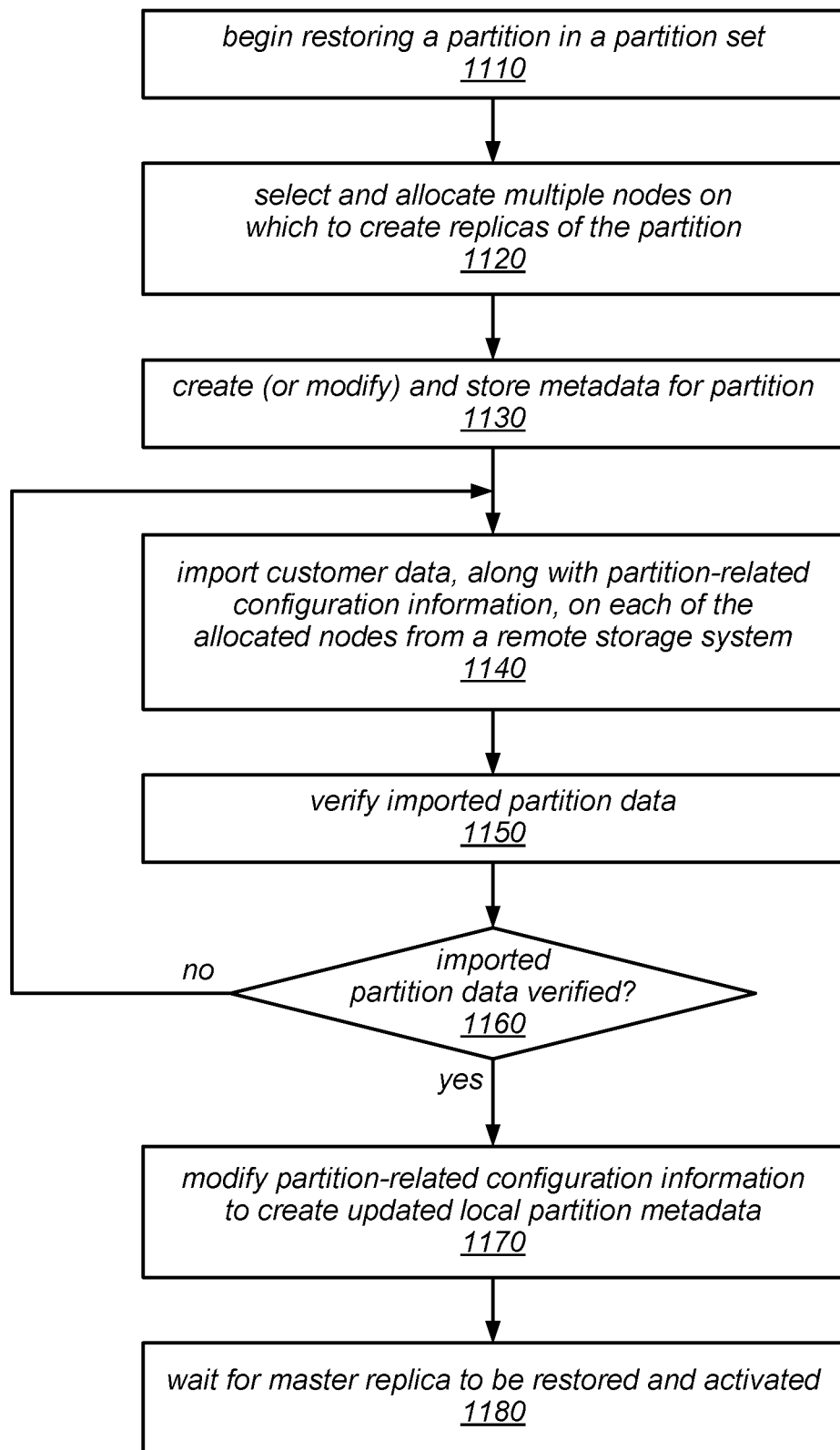
FIG. 11 is a flow diagram illustrating one embodiment of a method for restoring one of a set of partitions of a table.

One embodiment of a method for restoring one of a set of partitions of a table is illustrated by the flow diagram in FIG. 11. As illustrated in this example, the method may include beginning to restore a partition in a partition set (as in 1110), and selecting and/or allocating multiple storage nodes (or storage devices or logical storage volumes thereof) on which to create replicas of the partition (as in 1120). For example, in some embodiments, restoring a partition may include creating three replicas of the partition, each of which is hosted on a different physical or logical machine. As illustrated in FIG. 11, the method may include creating (or modifying) metadata for the restored partition (as in 1130) and storing it (e.g., storing it in the database into which the table is being restored along with metadata for the table and/or metadata for other ones of the partitions in the partition set).

The method may include importing from a remote storage system the customer data in the partition (e.g., the customer data in the copy of the partition that was previously uploaded to the remote storage system), along with partition-related configuration information, on each of the allocated nodes, as in 1140. For example, in some embodiments, the partition-related configuration information may include a partition identifier, a list of the members of the replica group for the partition, the key schema for the partition, an indication of the partition boundaries, and/or an identifier of the last transaction and/or write operation that was applied to the customer data in the partition (e.g., a log sequence number associated with the transaction or write operation).

As illustrated in this example, the method may include verifying the imported partition data (as in 1150) using any of a variety of suitable techniques. For example, in some embodiments, verifying the imported partition data may include comparing checksums generated for the imported partition (e.g., a checksum generated prior to or after uncompressing and/or unpackaging the imported partition) and for the original partition (e.g., a checksum generated prior to or after compressing and/or packaging the original partition). If the imported partition data is not successfully verified (shown as the negative exit from 1160), the method may include repeating the importing operation (which may include uncompressing and/or unpackaging the imported partition data) one or more times (e.g., until the imported partition data is successfully verified or until a pre-determined maximum number of unsuccessful attempts have been made). This is illustrated in FIG. 11 as the feedback from the negative exit of 1160 to 1140. In some embodiments, the method may include returning an error if the imported partition data is not successfully verified after a pre-determined maximum number of attempts (not shown).

As illustrated in this example, once the imported partition data has been verified (shown as the positive exit from 1160), the method may include modifying the partition-related configuration information to create updated local partition metadata, as in 1170. For example, in some embodiments, the updated local partition metadata may indicate a new partition ID for the partition, a new amount of committed IOPS or other provisioned resources, a change in indexing for the partition, or other configuration parameter changes made during or as a result of the restore operation. In some embodiments, the method may include waiting for a master replica in a replica group for the imported partition to be restored and activated, as in 1180, before the restore operation for the partition is considered to be complete.

Note that in other embodiments, the partition replicas may not be created during the restore operation itself, but may be created subsequent to importing a single copy of the partition from the remote storage system into the new table. In some such embodiments, the single restored copy of the partition may serve as the master replicas at least until one or more other replicas are created, at which point a master replica may be selected or elected from among the replicas in the group using any of various mechanisms and/or policies.

Figure 12:
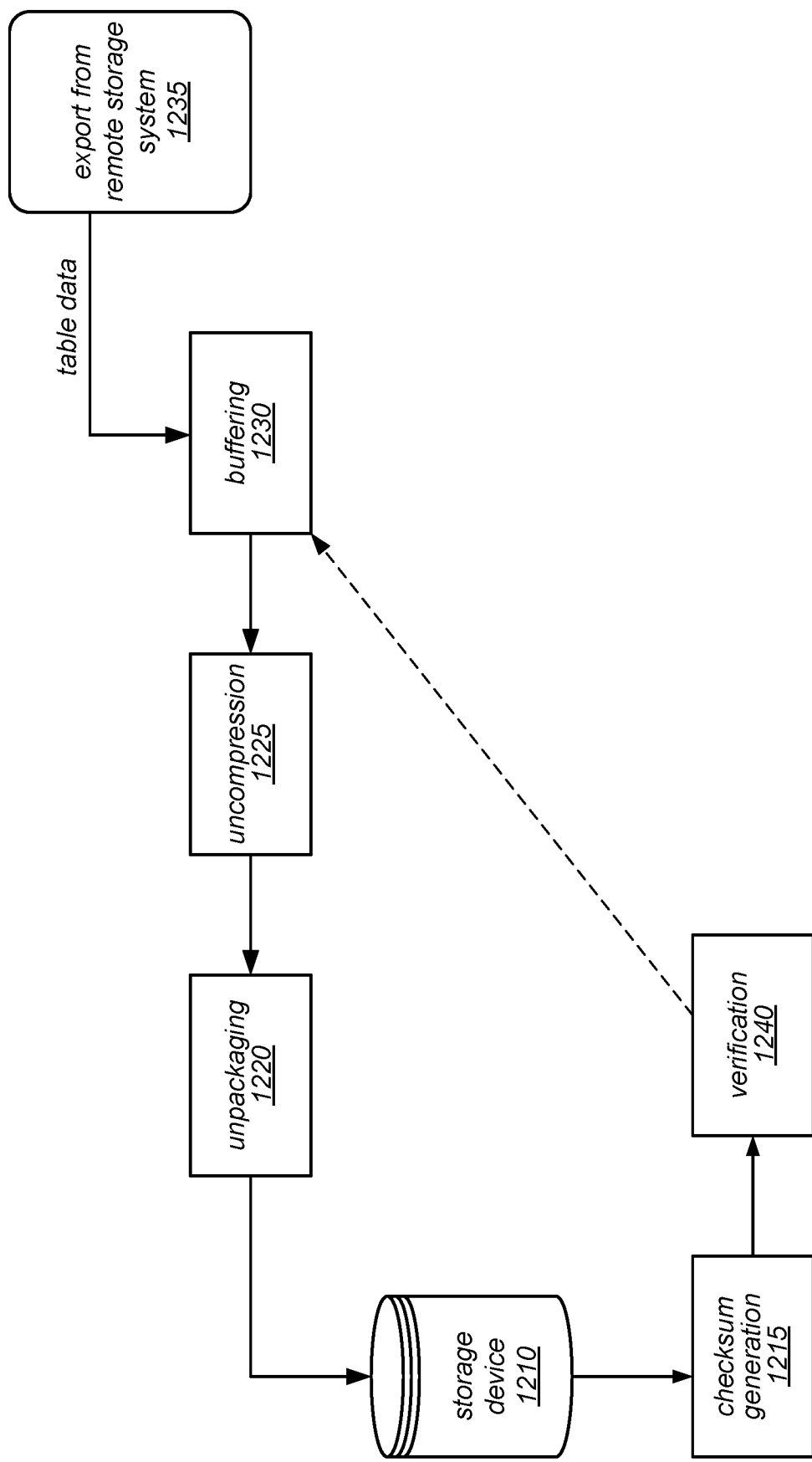
FIG. 12 is a block diagram illustrating an operation to restore a table from a remote storage system, according to one embodiment.

FIG. 12 is a block diagram illustrating an operation to restore a table from a remote storage system, according to one embodiment. As illustrated in this example, in response to request to restore a given table from a backup in a remote storage system, table data (e.g., a copy of one partition of the table that was previously backed up) may be exported from a remote storage system 1235 (e.g., remote key-value storage system for subsequent importing into a newly created table in storage device 1210 (which may be a physical storage device or a logical storage volume of a storage node in a distributed, scalable data storage system). In some embodiments, the exported table data may have been packaged and compressed when it was uploaded to remote storage system 1235 and may have been stored in remote storage system 1235 in its packaged and compressed form. In some embodiments, the exported table data may buffered (as in 1230), at least until the correctness of the exported table data has been verified as being uncorrupted. The exported table data may be uncompressed (as in 1225) and unpackaged (as in 1220), in preparation for importing it into the newly created table in storage device 1210.

In the illustrated embodiment, the exported, uncompressed, and unpackaged table data may be loaded into a corresponding partition in the newly created table in storage device 1210, and may be verified, as in 1240 (e.g., checked for data corruption that may have occurred when it was exported from the remote storage system or when it was uncompressed, unpackaged, or loaded into the newly created table. For example, in some embodiments, a checksum may be generated from the exported, uncompressed, and unpackaged partition that was loaded into storage device 1210 (as in 1215) and may be compared with a checksum that was previously generated for the original partition and stored with the backup copy of the partition in the remote storage system. In some embodiments a checksum that was previously generated for the original partition may have been stored in storage device 1210 (or another storage device of a storage node of the scalable data storage system) instead of (or in addition to) being backed up in the remote storage system, and this checksum may be used for the verification (at 1240). If the checksums do not match, the data storage system may be configured to retry one or more of the operations illustrated at 1225 and 1220 one or more times in an attempt to verify the table data that was buffered. If the buffered table data cannot be verified, it may be discarded, and the system may be configured to delete the restored partition from storage device 1210 and re-initiate the export operation and the operations at 1225 and 1220 in a further attempt to obtain an uncorrupted copy of the backed up partition data.

As illustrated in this example, an indication of whether or not the verification was successful may be sent to the buffering operation/component (e.g., to let it know whether and when to discard the exported table data). This is illustrated in FIG. 12 by the dashed line from 1240 to 1235. For example, once the exported, uncompressed, and unpackaged partition has been loaded into the newly created table in storage device 1210 and verified (or has been determined to be corrupt), the exported table data may be deleted from the buffer. Note that in some embodiments, restore operations for multiple partitions may be issued independently and in parallel. In this example, if and when all of the partitions of the table have been successfully verified, the restored table may be activated in the scalable data storage system (e.g., it may be made available for receiving, accepting, and/or servicing read and/or write requests that are directed to the new table). As previously noted, in some embodiments, a restore operation may include restoring multiple replicas of each partition, which may involve repeating the operations illustrated in FIG. 12 and described above multiple times for each partition, or may include restoring one copy of each partition, and then using the replication processes of the scalable data storage system itself to create additional replicas of the restored partitions prior to activating the restored table. Note also that in some embodiments, some or all of the operations illustrated as 1215, 1220, 1225, 1230, and/or 1240 may be performed by an external workflow component that coordinates, controls, and monitors the restore process for one or more partitions of a table.

As previously noted, the data storage systems described herein may provide various backup-restore related APIs. For example, a CreateBackup API may allow users to create a backup of a table. In some embodiments, there may be limits on the number of backups that can be in progress for a particular table (e.g., one), and/or on the number of different backup-related operations (e.g., CreateBackup, CopyBackup, and/or DeleteBackup operations) that can be inflight at a time for a given database or table thereof. The CreateBackup operation may trigger an asynchronous workflow to begin creating the backup for the table.

In various embodiments, the CreateBackup API may include as input (request) parameters any or all of the following: a TableName parameter (e.g., a string representing the name of the table to be backed up, where the named table must be in ACTIVE state at the time of the request) and/or a Description parameter (e.g., a string that represents a description for the backup).

In some embodiments, the CreateBackup API may include as output (response) parameters any or all of the following: a BackupDescription parameter (e.g., a map that servers as a container for details about the backup); a BackupID parameter (e.g., a string used as an identifier of the backup being created); the Description parameter described above; a CreationDateTime parameter (e.g., a number representing the time at which the backup was created or requested); a CompletionDateTime (e.g., a number representing the time at which the backup was completed); a BackupStatus parameter (e.g., a string having one of the values {PENDING, AVAILABLE, CREATING, DELETING}); a TableName parameter (e.g., a string representing the source table name, i.e., the name of the table from which the backup was created); a TableCreationDateTime parameter (e.g., a string representing the time at which the source table was created); the schema for the table; a ProvisionedThroughput parameter (e.g., an array representing a serialized form of the provisioned throughput for reads and writes); a LocalSecondaryIndexes parameter (e.g., an array representing a serialized description of the indexes of the table); a TableSizeBytes parameter (e.g., a number representing the size of the source table); an ItemCount parameter (e.g., a number representing the item count of the source table at the time of backup creation); and/or a RestoresInProgress parameter (e.g., a string list that identifies the list of tables to which the backup is currently being restored).

In various embodiments, the CreateBackup API may return one or more of the following error messages (where applicable): ResourceInUseException (400), if the customer is attempting to create a backup on a table that is being deleted/created/backed-up; ResourceNotFoundException (400), if the table which is being requested to be backed up does not exist; and/or LimitExceededException (400), if the number of concurrent backup requests (cumulative number of Create, Copy, Restore, Delete) in this region has reached the limit.

Note that in other embodiments, there may be more, fewer, or different input, output, or error response parameters for the CreateBackup API than those described herein.

Figure 13:
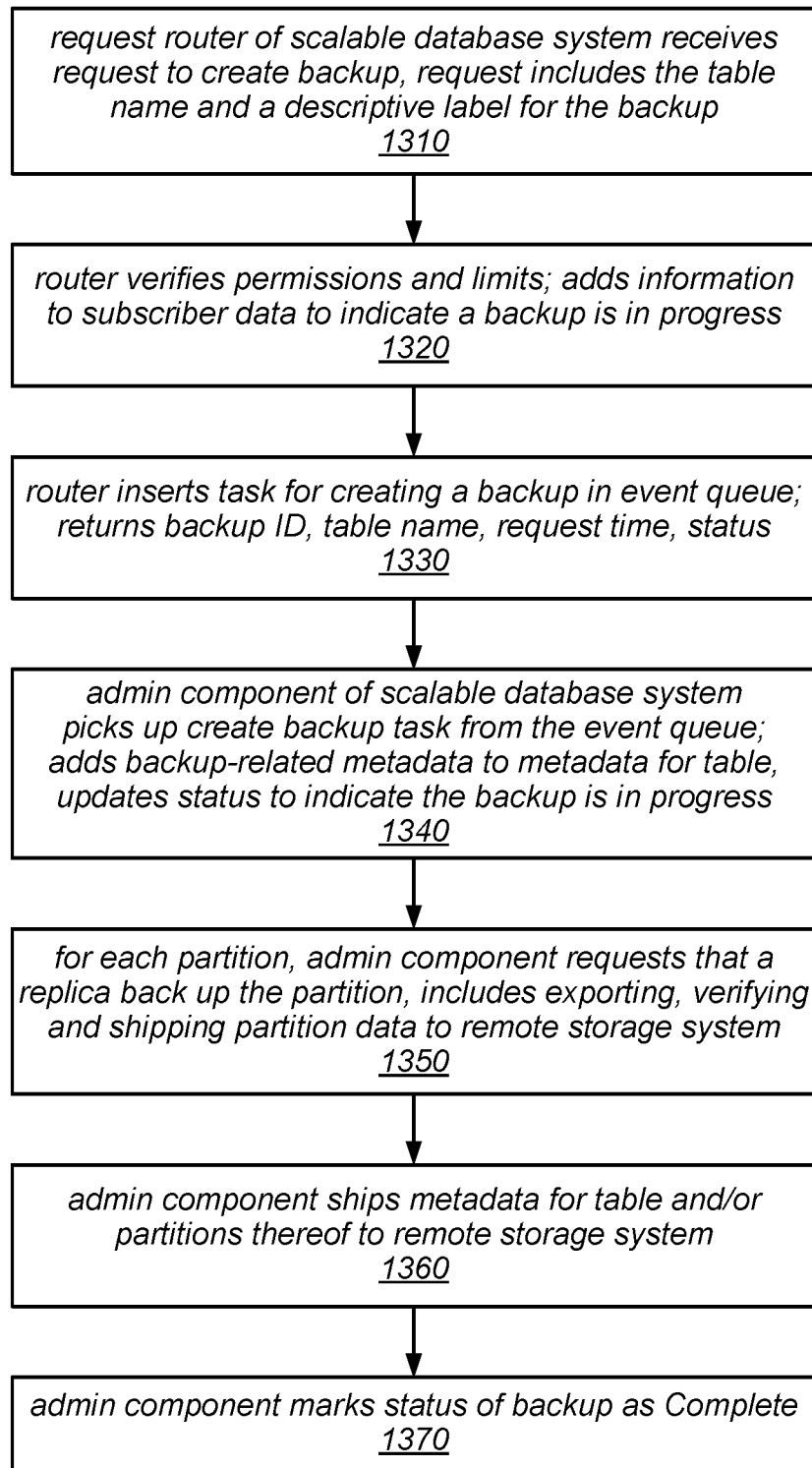
FIG. 13 is a flow diagram illustrating one embodiment of a method for creating a backup of a table in a scalable database system.

One embodiment of a method for creating a backup of a table in a scalable database system is illustrated by the flow diagram in FIG. 13. As illustrated at 1310 in this example, the method may include a request router of a scalable database system (such as any of the distributed data storage systems described herein) receiving a request to create a backup, where the request includes the table name and a descriptive label for the backup. For example, in some embodiments, the request may be received from subscriber to a database service provided by the scalable database system or from a client application (e.g., automatically, periodically, or according to a pre-determined schedule, such as a default schedule or one negotiated as part of an agreement with a database service subscriber), or in response to a trigger condition or event). As illustrated in FIG. 13, the method may include the request router verifying the request against applicable permissions and limits and/or adding information to subscriber data to indicate that a backup is in progress for the identified table, as in 1320. For example, the request router may be configured to check and/or modify metadata for the table, the partition and/or the backup operation, such as that described herein. In some embodiments, the requestor (e.g., the subscriber or client that requested the backup) may be able to determine the status and/or monitor the progress of the backup operation using a DescribeBackup API (e.g., the client/subscriber may be able poll for a backup status of "Complete" or "Ready" using such an API).

As illustrated at 1330, the method may include the request router inserting a task for creating a backup in an event queue, and returning a response that includes a backup identifier, a table name, an indication of the time of the request, and/or an indication of the status of the backup (e.g., backupStatus=200, indicating that the backup task has been successfully enqueued). The method may include an administrative component of the scalable database system picking up the create backup task from the event queue, adding backup-related metadata to the stored metadata for table, which may include updating the status to indicate that the backup operation is in progress, as in 1340.

The method may include, for each partition of the table being backed up, the administrative component requesting that a replica back up the partition, which may include exporting, verifying and shipping the partition data to a remote storage system, as in 1350. For example, in some embodiments, the administrative component may be configured to spawn separate tasks to back up each partition individually, independently, and in parallel (or to invoke one or more external workflow managers to monitor and control the partition backup operations). In other embodiments, some or all of the partitions of the table may be backed up sequentially. Once all of the partitions have been backed up, the method may include the administrative component shipping metadata for the table and/or for some or all of the partitions thereof to the remote storage system (as in 1360) and updating the status of the backup to indicate that the backup operation is Complete or Ready (as in 1370).

In some embodiments, a DescribeBackup API may return comprehensive information about a particular backup. This API, like DescribeTable, is consistent in that it returns the latest status of the backup. In various embodiments, the DescribeBackup API may include as an input (request) parameter a BackupID (a string that identifies the backup to be described). The DescribeBackup API may include as output (response) parameters any or all of the response parameters of the CreateBackup API described below. In some embodiments, if there is not an existing backup that is identified by the BackupID specified in the request, a "ResourceNotFoundException" (400) may be returned. Note that in other embodiments, there may be more, fewer, or different input, output, or error response parameters for the DescribeBackup API than those described herein.

In some embodiments, in response to receiving a request for information about a particular backup (e.g., through the DescribeBackup API) a request router may search the backup metadata table for a record corresponding to the specified BackupID. The backup metadata table may return the requested record to the request router, (if it exists), and the request router may return an indication of success (200), along with the customer visible attributes from the backup record.

In some embodiments, the RestoreTable API may creates a new table from an existing backup. Note that in various embodiments, there may be limits on the RestoreTable API. For example, in some embodiments, a backup cannot be restored to an already existing table. However, in some embodiments, a backup may be simultaneously restored to several tables (in the same region) and/or may be copied to backup storage in different regions. In some embodiments, there may be limit on the number of table related control plane operations (e.g., CreateTable, UpdateTable, DeleteTable, and/or RestoreTable) that can be inflight at any given time.

In various embodiments, the RestoreTable API may include as input (request) parameters any or all of the following: a BackupID parameter (e.g., a string that identifies the backup to be restored); a TableName parameter (e.g., a string representing the name of the table to which the backup will be restored); and/or an optional ProvisionedThroughput parameter for the restored table (as described above). Note that in some embodiments, if a ProvisionedThroughput parameter value is not provided in a request to restore a table, the corresponding parameter values associated with the source table may be used.

In various embodiments, the RestoreTable API may include as output (response) parameters any or all of the output parameters described above for the CreateBackup API. However, in some embodiments, additional fields may be included in the BackupDescription parameter in the response. For example, the BackupDescription parameter may include any or all of the following: a SourceBackupID field (e.g., a string that identifies the backup from which the table was restored); a LastBackupDateTime field (e.g., a string that represents the time at which the table was last backed up); and/or a LastBackupID field (e.g., a string that identifies the latest backup for the table). Note that the LastBackupDateTime field and the LastBackupID field indicate details about the backup that was most recently successfully completed (not the last backup that was requested or initiated).

In various embodiments, the RestoreTable API may return one or more of the following error messages (where applicable): ResourceInUseException (400), if the customer is attempting to restore a backup to a table with the same name as a table that already exists or if the backup to be restored is not yet in the AVAILABLE state; ResourceNotFoundException (400), if no backup with the specified BackupID exists; and/or LimitExceededException (400), if the number of concurrent table control plane operations in the region has reached a pre-determined limit or if the number of tables in the region has reached a pre-determined limit.

Note that in other embodiments, there may be more, fewer, or different input, output, or error response parameters for the RestoreTable API than those described herein.

Figure 14:
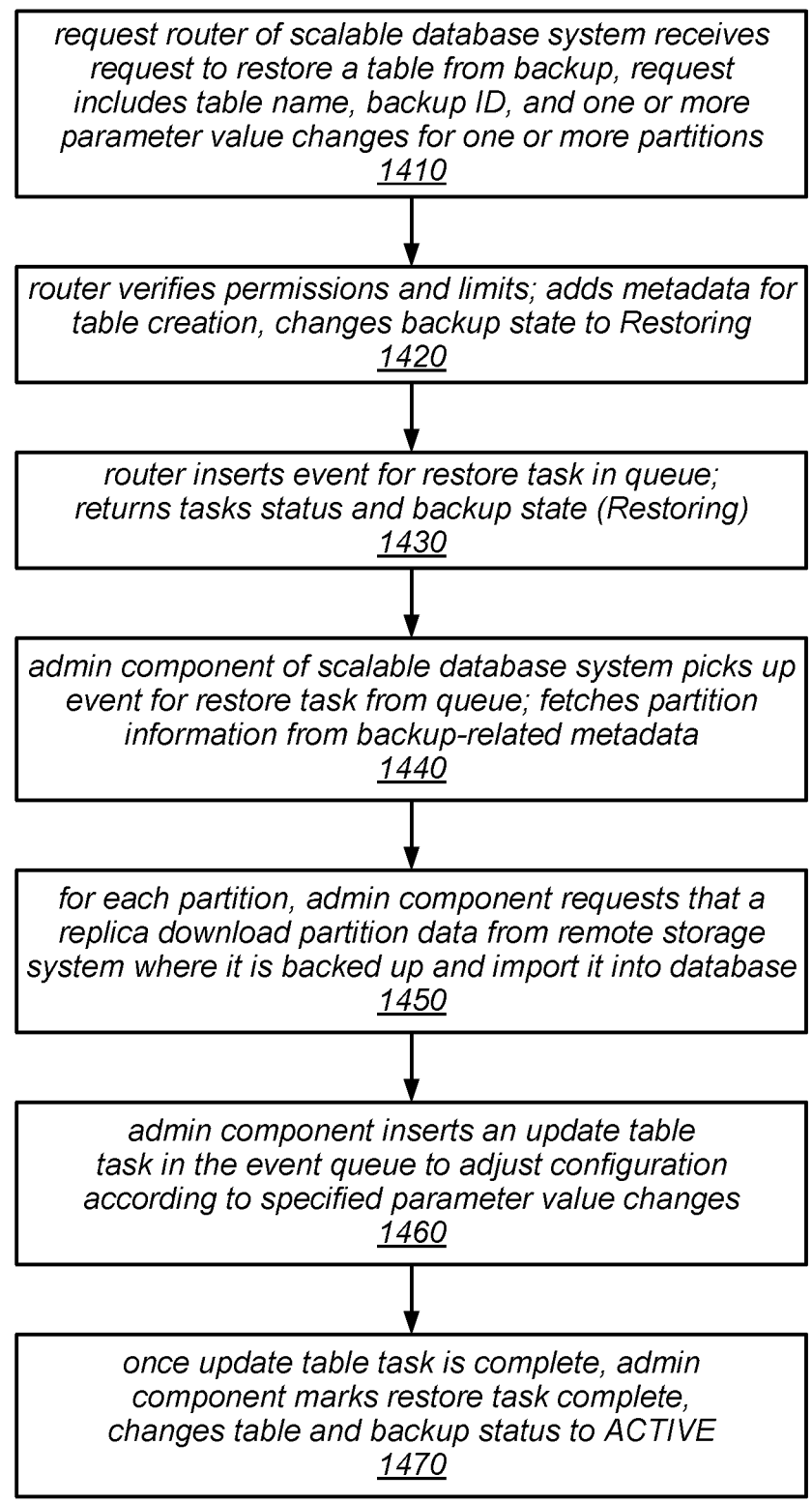
FIG. 14 is a flow diagram illustrating one embodiment of a method for restoring a table in a scalable database system.

One embodiment of a method for restoring a table in a scalable database system is illustrated by the flow diagram in FIG. 14. As illustrated at 1410, in this example, the method may include a request router of a scalable database system receiving a request to restore a table from a backup, where the request includes a table name, a backup ID, and/or one or more parameter value changes for one or more of the partitions of the table that is to be restored. For example, in some embodiments, a customer (e.g., a subscriber or client) may be able to specify (or request) a change in the provisioned resources (e.g., a change in the provisioned throughput capacity and/or a change in the provisioned storage capacity) for a table (and/or any of its partitions) as part of an operation to restore the table from backup. In other embodiments, a customer (e.g., a subscriber or client) may be able to specify (or request) a change (or addition) to the indexing of the items in the table as part of an operation to restore the table from backup.

As illustrated in FIG. 14, the method may include the request router verifying the request against applicable permissions and limits, creating (or adding) metadata for the new table to be created as part of the restore operation, and/or changing the state of the backup to indicate that a restore operation is in progress (e.g., "Restoring"), as in 1420. For example, the request router may be configured to check and/or modify metadata for the table, the partition and/or the backup operation, such as that described herein. In some embodiments, the requestor (e.g., the subscriber or client that requested the restore operation) may be able to determine the status and/or monitor the progress of the restore operation using a DescribeBackup API (e.g., the client/subscriber may be able poll for a backup status of "Complete" or "Ready" using such an API).

The method may also include the request router inserting restore task in an event queue, and returning the status of the task (e.g., backupStatus=200, indicating that the restore task has been successfully enqueued), and an indication of the state of the backup (e.g., Restoring), as in 1430. As illustrated in this example, the method may include an administrative component of the scalable database system picking up the restore task from the event queue, and fetching partition information (e.g., location information for the partitions of the table) from backup-related metadata that is stored in the scalable database system, as in 1440. Subsequently, for each partition, the method may include the administrative component requesting that a replica download partition data from the remote storage system in which it was previously backed up, and importing it into the new table in the database, as in 1450. For example, in some embodiments, the administrative component may be configured to spawn separate tasks to restore each partition individually, independently, and in parallel (or to invoke one or more external workflow managers to monitor and control the partition restoring operations). In other embodiments, some or all of the partitions of the table may be restored sequentially.

Once all of the partitions have been restored, the method may include the administrative component inserting an update table task in the event queue to adjust the configuration of the table and/or one or more of its partitions, according to the parameter value change(s) that were specified in the request to restore the partition, as in 1460. In some cases, applying a specified configuration parameter value change may require or may result in (e.g., trigger) a partition splitting operation or a partition merge operation. For example, if the specified configuration parameter value change is an increase in provisioned storage capacity or throughput capacity for at least one partition, applying the specified configuration parameter value change may include (or trigger) splitting or moving the partition and/or one or more other partitions, according to one or more applicable resource allocation policies. In another example, if the specified configuration parameter value change is a decrease in provisioned storage capacity or throughput capacity for at least one partition, applying the specified configuration parameter value change may include (or trigger) merging two or more partitions (which may or may not include the partition or partitions for which the provisioned storage capacity or throughput capacity are decreased), according to one or more applicable resource allocation policies. In yet another example, if the specified configuration parameter value change is a change in or addition of an attribute by which items in the table are indexed, applying the specified configuration parameter value change may include (or trigger) updating an index for the table (and/or its partitions), or creating an additional index for the table (and/or its partitions), in some embodiments.

In some embodiments, if applying a specified configuration parameter value change involves a change in the amount of provisioned resources for the table, it may result in (or trigger) an automatic re-distribution of the provisioned resources across the partitions of the table (whether or not the change causes a partition move, split, or merge operation). In some embodiments, such a re-distribution may change the fraction of the total amount of a provisioned resource that is allocated to one or more of the partitions, and may (in some cases) include re-normalizing the fractions of the total amount of the provisioned resource allocated to at least some of the partitions so that the sum of the amounts of the provisioned resource that are allocated to each of the partitions is equal to the total amount of the resource that is provisioned for the table. In other embodiments, if applying a specified configuration parameter value change involves a change in the amount of provisioned resources for the table, a user may explicitly initiate the re-distribution of the provisioned resources for the table (e.g., by submitting one or more requests to update the table, as described herein).

As illustrated in FIG. 14, once the update table task is complete, the method may include the administrative component updating the status of the restore task to indicate that it is complete, and/or changing the state of the new table (e.g., in the stored metadata for the new table) to ACTIVE (as in 1470), which may make the new table available to receive and service read and/or write requests directed to the new table.

In general, data storage system users may wish to back up their table data in the same region because the original table may become corrupted due to unintended changes. For disaster recovery, some users may also want to back up their table data in another region. In some embodiments, the data storage systems described herein may support backing up a table to a remote storage system in another (e.g., via a CopyBackup API). In some embodiments, these systems may support restoring a backup across regions, e.g., via a call to the CopyBackup API (in the source region) followed by a call to the RestoreTable API (in the destination region). In systems that support these operations, a data storage system user may check the status of the CopyBackup API via a call to the DescribeBackup API in either the source or destination region.

In some embodiments, a cross-region backup operation may be initiated in the source region. In such embodiments, in response to a request to perform a cross-region backup operation, a component of an instance of the data storage system in the source region (e.g., an administrative component) may validate that the backup is ready to be copied from the source region before notifying the user that it will perform the copy operation. The administrative component (or another component) in the source region may also notify a corresponding administrative component (or another component) of an instance of the data storage system in the destination region about the metadata to make sure it can handle the copy on the destination. In some embodiments, this cross-region communication may take place using the messaging mechanisms of a front end module of the data storage system (e.g., over a message bus 430 of a front end module 340), e.g., using an encrypted communication protocol (e.g., HTTPS).

In some embodiments, management of the copying operation is the responsibility of a workflow manager component in the source region (e.g., one invoked in the source region in response to receiving the cross-region copy request). The copying operation copies a backup of a table that was stored in a remote storage system in the source region to another instance of the remote storage system in the destination region. In some embodiments, once the copying operation is completed, the metadata about the copied backup may need to be modified to reflect the mapping of the copied, backed up partitions of the table to resources in the remote storage system in the destination region. In some embodiments, once the backup has been copied to the remote storage system instance in the destination region, and the mapping has been updated, the backup stored in the remote storage system instance in the destination region may be made available for restoring the table in the data storage system instance in the destination region, e.g., using the Restore-Table API and processes described herein. As is the case with other restore operations, in some embodiments a request to restore a table may include a change for a configuration parameter of the restored table and/or any of its partitions.

As described above, the CopyBackup API may be used to copy a backup to a different region. As previously noted, the BackupID for the backup that is copied may remain the same in the destination region as it was in the source region, and a portion of its value may indicate the region in which it was originally generated, in some embodiments.

In various embodiments, the CopyBackup API may include as input (request) parameters any or all of the following: a BackupID parameter (e.g., a string that identifies the backup to be restored); and/or DestinationRegion parameter (e.g., a string that identifies the destination region to which the backup should be coped). In various embodiments, the CopyBackup API may include as output (response) parameters any or all of the output parameters described above for the CreateBackup API. In various embodiments, the CopyBackup API may return one or more of the following error messages (where applicable): ResourceInUseException (400), if the backup to be copied is not in the AVAILABLE state; ResourceNotFoundException (400), if no backup with the specified BackupID exists; and/or LimitExceededException (400), if the number of concurrent backup control plane operations in the region has reached a pre-determined limit. Note that in other embodiments, there may be more, fewer, or different input, output, or error response parameters for the CopyBackup API than those described herein.

In some embodiments, in order to support a cross-region (e.g., via the CopyBackup API), the request router and administrative components of the data storage systems in each region may need to be aware of some information about the other regions. In some embodiments, there may be a Regions table in which such information may be updated dynamically (e.g., using a periodic scan). In some embodiments, this table may include, for each region: a formal region name, a readable name for the region (which may be used for metering or reporting), a region ID (which may be used as a portion of each BackupID created in the region), and one or more outgoing copy speed limits for the region (e.g., in MBPS).

Figure 15:
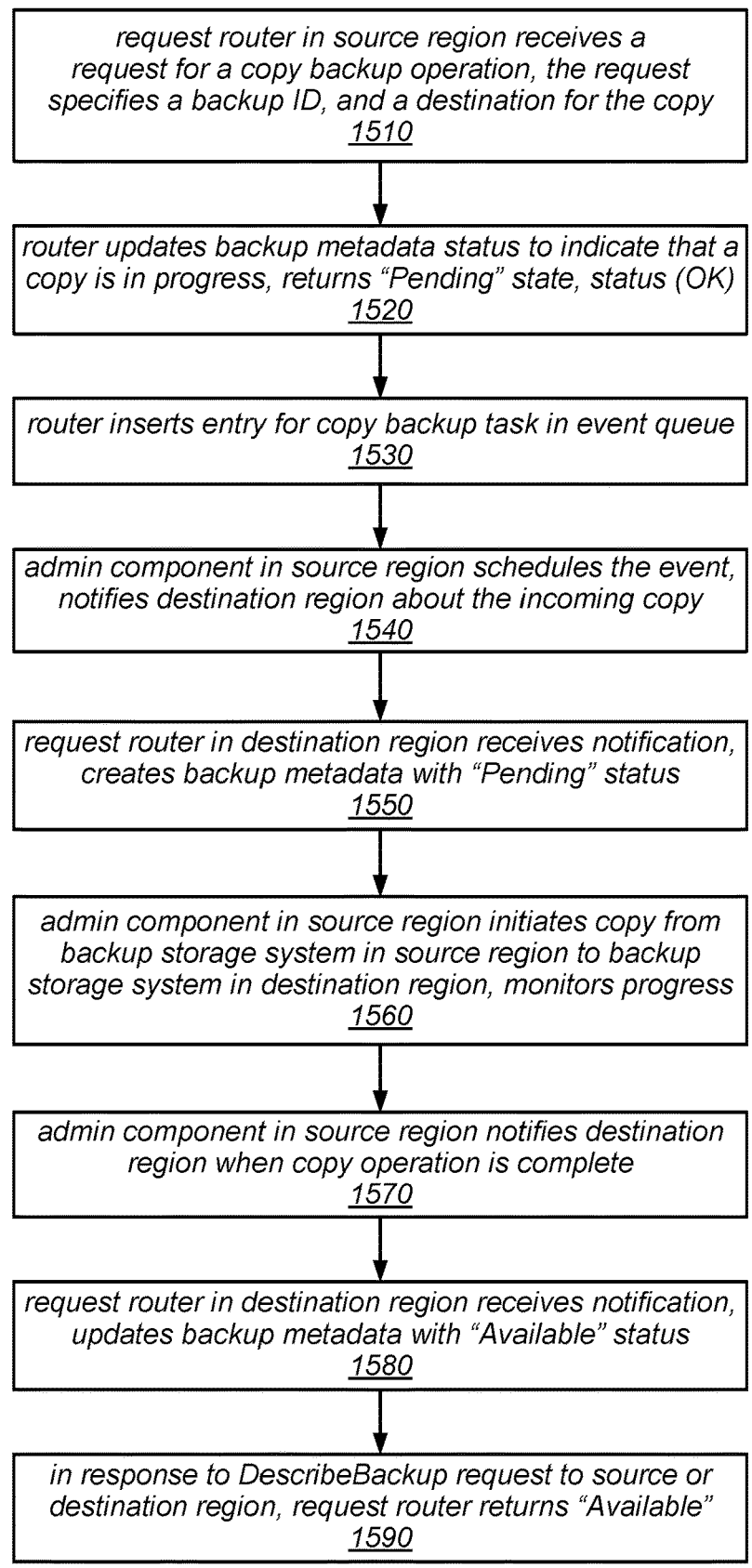
FIG. 15 is a flow diagram illustrating one embodiment of a method for creating a copy of a backup in a destination region.

One embodiment of a method for creating a copy of a backup in a destination region is illustrated by the flow diagram in FIG. 15. As illustrated at 1510, in this example, the method may include a request router of a distributed data storage system in source region receiving a request for an operation to copy a backup, where the request specifies a backup ID and a destination for the copy. The method may include the request router creating or updating metadata for the backup (e.g., metadata indicating the status of the backup) to indicate that a copy operation is in progress, and returning the state of the copy operation (e.g., "PENDING") and the status of the copy operation (e.g., 200, OK), as in 1520. As illustrated in this example, the method may include the request router inserting an entry for the copy backup task in an event queue, as in 1530, after which an administrative component of the distributed data storage system in the source region may schedule the event, and notify the destination region about the incoming copy, as in 1540. In various embodiments, such a notification may be communicated to the destination region over the Internet or over a private communications link. For example, in some embodiments, the cross-region communication may employ a privileged API that communicates on the public front-end components of the data storage system instances.

The method may include a request router of a distributed data storage system in the destination region (e.g., a separate instance of the same type of distributed data storage system as that instantiated in the source region) receiving the notification and, in response, creating backup metadata for the incoming backup copy indicating that an operation to copy the backup to the destination region has a status of "PENDING", as in 1550. In other embodiments, a different component of the distributed data storage system may be responsible for this communication, rather than the request router. As illustrated in this example, the method may include an administrative component of the distributed data storage system in the source region initiating an operation to copy the backup from a backup storage system in the source region to a corresponding backup storage system in the destination region, and monitoring the progress of the copy operation, as in 1560.

Once the copy operation is complete, the method may include the administrative component of the distributed data storage system in the source region notifying the destination region that the copy operation is complete, as in 1570. The method may include the request router of the distributed data storage system in the destination region receiving the notification, and updating the metadata for the backup (e.g., metadata indicating the status of the backup) to indicate that the copy of the backup metadata is "Available", as in 1580. Subsequently, in response to a request to describe the backup, directed to the source region or the destination region (where the request includes the backup ID), the request router of the distributed data storage system in the targeted region may return a backup status of "Available", as in 1590.

As previously noted, after a backup has been copied to a corresponding remote storage system instance in a destination region, a user of a distributed data storage system in the destination region may restore the table from the copied backup to the distributed data storage system in the destination region (with or without changes in the configuration parameter values for the restored table).

In some cases, a customer may wish to delete a backup for any of a variety of reasons (e.g., because the customer has taken a more recent backup, the backup is too old and hence unusable, the purpose of this backup was only to copy it across region, etc). In some embodiments, a DeleteBackup API may allow a customer delete a backup that is situated in the region in which that DeleteBackup API is invoked. In some embodiments, in response to a request to delete backup (e.g., via a DeleteBackup API call) the request router in the distributed data storage system may mark the backup for delete and return an indication of success to the customer. In such embodiments, an administrative component of the distributed data storage system may be responsible for actually deleting the backup and cleaning-up up any related metadata afterward (e.g., by invoking an external workflow component or putting a tasks in an event queue for a subsequent sweeper process to pick up). Until the actual delete operation has been initiated, the backup record may indicate a status of "PendingDeletion." Once the actual delete operation begins, the status may be changed to "Deleting."

In various embodiments, the DeleteBackup API may include as its only input (request) parameter a BackupID parameter (e.g., a string that identifies the backup to be deleted). In various embodiments, the DeleteBackup API may include as output (response) parameters any or all of the output parameters described above for the CreateBackup API. In various embodiments, the DeleteBackup API may return one or more of the following error messages (where applicable): ResourceInUseException (400), if the backup to be deleted is being copied or restored or if the backup to be deleted is not yet in the AVAILABLE state; ResourceNotFoundException (400), if no backup with the specified BackupID exists; and/or LimitExceededException (400), if the number of inflight backup control plane operations in the region has reached a pre-determined limit. Note that in other embodiments, there may be more, fewer, or different input, output, or error response parameters for the DeleteBackup API than those described herein.

Figure 16:
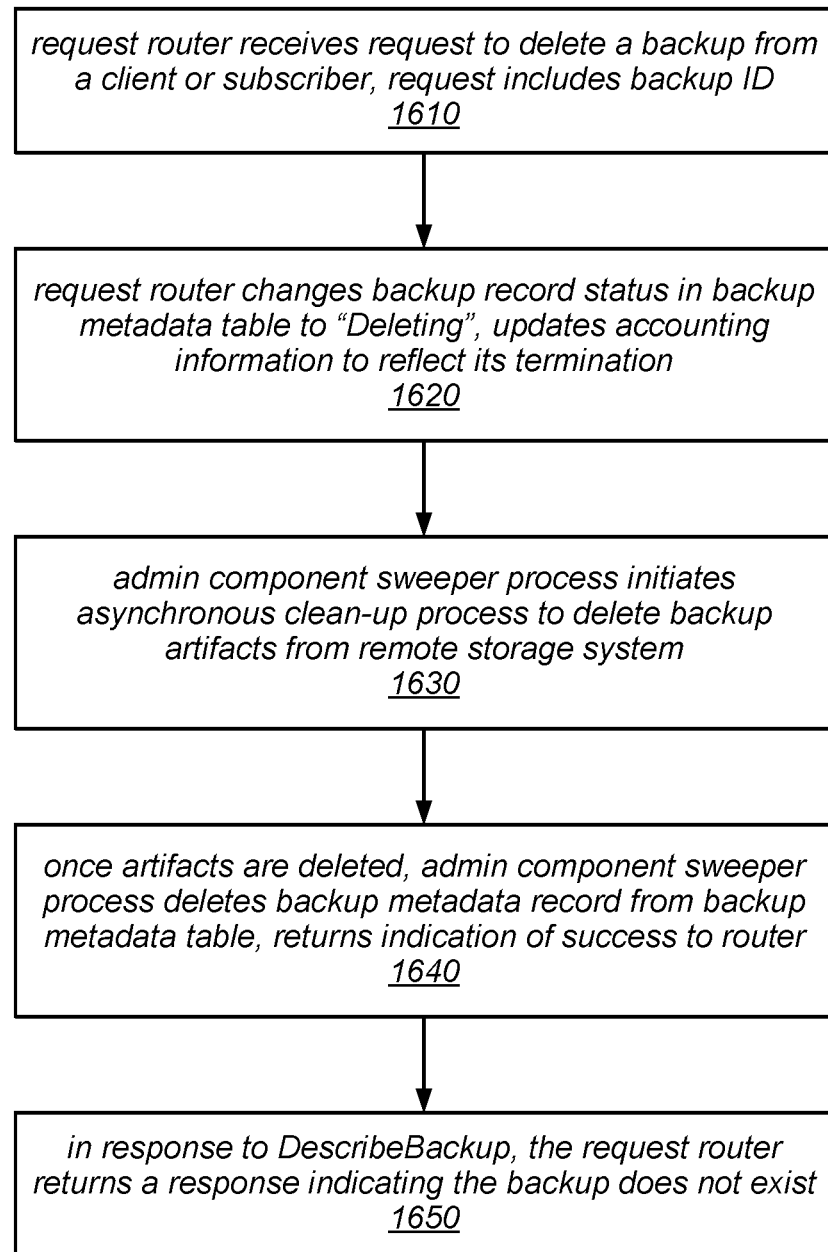
FIG. 16 is a flow diagram illustrating one embodiment of a method for deleting a backup.

One embodiment of a method for deleting a backup is illustrated by the flow diagram in FIG. 16. As illustrated at 1610, in this example, the method may include a request router of a request router of a distributed data storage system receiving, e.g., from a client or data storage service subscriber, a request to delete a backup, where the request includes a backup ID. The method may include the request router changing the corresponding backup record status in a backup metadata table to "Deleting" and/or updating account information for the client or subscriber to reflect the termination of this resource, as in 1620. For example, updating the account information may result in terminating billing/charges for storing the backup, in some embodiments. As illustrated in this example, the method may include an administrative component sweeper process initiating an asynchronous clean-up process to delete the artifacts of the identified backup from a remote storage system in which it was previously backed up, as in 1630. Note that in some embodiments, this clean-up process may not actually begin immediately. For example, it may be scheduled to begin during the next designated maintenance period, after another backup or archive is generated or in response to other trigger event, which may occur within a few minutes or hours of the request, or may not occur for several days or longer, in different embodiments. As noted above, in some embodiments, when the delete operation begins, the status indicated in the backup record for the backup may be changed to "Deleting."

As illustrated in this example, once the artifacts of the identified backup have been deleted, the method may include the administrative component sweeper process deleting the corresponding backup metadata record from the backup metadata table, and returning an indication of success to the request router, as in 1640. Subsequently, in response to receiving a request for information about the backup (e.g., a DescribeBackup request that includes the backup ID), the method may include the request router returning a response indicating that the specified backup does not exist (e.g., "backup not found" or a ResourceNotFoundException (400) error message), as in 1650.

In some embodiments, the systems described herein may support a ListBackups API, which may return an array of backups associated with an account in a particular region (e.g., the current region). In various embodiments, the ListBackups API may include as input (request) parameters any or all of the following: a StartDateTime parameter (e.g., a number indicating that only backups that were created after this time should be listed); an EndDateTime parameter (e.g., a number indicating that only backups that were created before this time should be listed); a TableName parameter (e.g., a string indicating that only backups that originated from a table that had this name should be listed); a Limit parameter (e.g., a number indicating the maximum number of records that can be returned at once); and/or a LastEvaluatedKey parameter (e.g., a map . . . LastEvaluatedKey returned by a previous ListBackups call).

In some embodiments, the ListBackups API may include as output (response) parameters any or all of the following: a BackupSummaries parameter (e.g., a container/map indicating a list of BackupSummary containers); and/or a LastEvaluatedKey parameter (e.g., a map . . . a pagination token). In some embodiments, each BackupSummary (e.g., a map . . . container for each backup) may include a subset of the fields returned by DescribeBackup. For example, it may include a BackupID field, a Description field, a BackupOriginCreationDateTime field, a BackupStatus field whose value is one of {PENDING, AVAILABLE, CREATING, DELETING}, a TableName field, and/or a LastEvaluatedKey field, where if the ListBackups operation included a TableName, then LastEvaluatedKey.TableName will always be the same value. Note that in other embodiments, there may be more, fewer, or different input, output, or error response parameters for the ListBackups API than those described herein.

In some embodiments, the distributed data storage systems described herein may be configured to back up table data (e.g., the data of various partitions of database tables) and/or metadata about tables, partitions, and/or backups to a remote key-value storage system. In some embodiments, the remote key-value storage system may be dedicated for backup storage, while in other embodiments the remote key-value storage system may provide general-purpose storage for a variety of clients and/or client applications. In various embodiments, a distributed data storage system, a general-purpose computing system, or a computing system that provides another type of service that stores data locally in-memory (e.g., ephemerally) may write one or more copies of the partition data to a remote key-value storage system that employs disk, solid-state storage devices, or another type of persistent storage media in order to provide durability. As described in more detail herein, the distributed data storage systems described herein may be able to restore backed up partition data from the backup system, which may include a workflow manager component accessing and importing each backed up partition in the remote system using a unique identifier of the backed up partition as a key.

In some embodiments, each partition that is backed up in the remote key-value storage system may be stored as an individual (or separable) object in a remote backup storage system that provides durable key-value storage, and the keys for each partition that is backed up (e.g., their unique identifiers) may be stored in metadata associated with the table, the partition and/or the backup. In some embodiments, the distributed data storage systems described herein may provide high durability storage to its clients/subscribers by backing up database tables (on a partition basis) in a remote key-value durable storage system.

Figure 17:
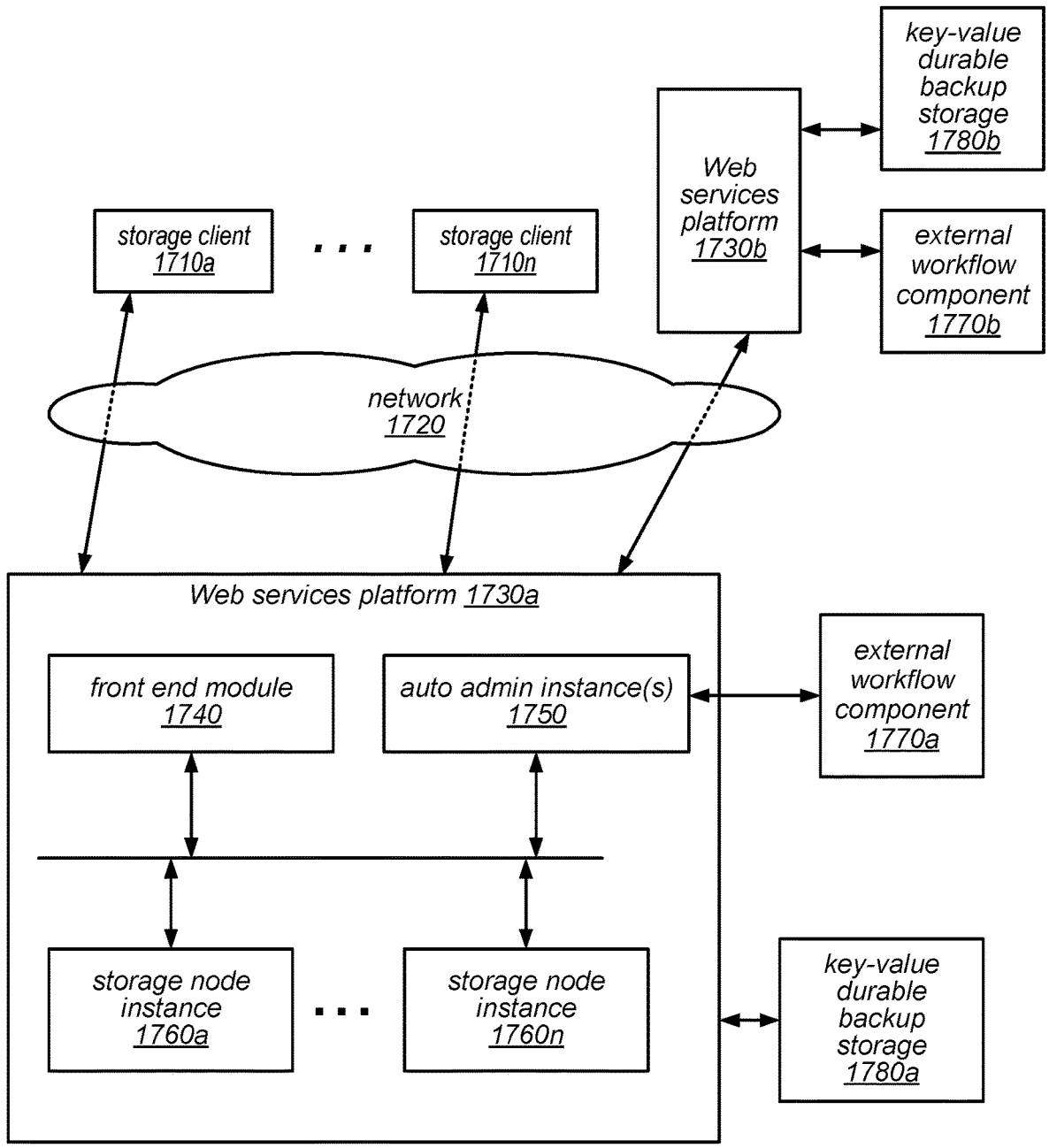
FIG. 17 is a block diagram illustrating various components of a Web services platform that provides a scalable database service, according to some embodiments.

FIG. 17 is also a block diagram illustrating various components of a Web services platform, which may provide a scalable database service, such as that described herein. In various embodiments, some of the components illustrated in FIG. 17 may not be visible to the clients of the Web services platform (or to the scalable database service). As illustrated in this example, storage clients 1710a-1710n may access Web services platform 1730a (e.g., front end module 1740 and/or a console of an auto admin instance 1750) via network 1720 (e.g., these components may be network-addressable and accessible to the storage clients 1710a-1710n). In this example, external workflow component 1770a may include a workflow manager (e.g., a state machine) that controls, coordinates, and monitors the progress of various backup and restore operations, such as those described herein.

In this example, key-value durable backup storage 1780a (which may be located in the same region as Web services platform 1730a) and/or key-value durable backup storage 1780b (which may be located in a different region, i.e. the same region as Web services platform 1730b) may be employed by Web services platform 1730 when performing various backup and restore operations, such as those described herein. In other words, in some embodiments, when backing up a table whose partitions are stored on any of storage node instances 1760a-1760n, the scalable database service provided by Web services platform 1730a may be configured to employ external workflow component 1770a to control an operation to back up each of the partition to key-value durable backup storage 1780a. Similarly, in response to a request to perform a cross-region copy backup operation, the scalable database service provided by Web services platform 1730a may be configured to employ external workflow component 1770b to control an operation to copy a backup from key-value durable backup storage 1780a to key-value durable backup storage 1780b, with or without assistance from Web services platform 1730b.

For example, for a cross-region copy backup, most of the work to control, coordinate, and monitor the progress of the cross-region copy backup operation is performed by the Web services platform and/or workflow manager in the source region (e.g., by Web services platform 1730a and/or workflow manager 1770a) However, the Web services platform in the source region (e.g., Web services platform 1730a) may communicate with a Web services platform in the destination region (e.g., Web services platform 1730b) to initiate the creation of a backup in key-value durable backup storage 1780b, which may include invoking a workflow manager (e.g., a state machine) of external workflow component 1770b that controls, coordinates, and/or monitors the progress of the cross-region copy backup operation from the perspective of the destination region. However, key-value durable backup storage 1780a and/or 1780b may or may not be network-addressable and accessible to the storage clients 1710a-1710n, in different embodiments. For example, in some embodiments, Web services platform 1730a and/or Web service platform 1730b may perform these operations and/or other operations involving key-value durable backup storage 1780a and/or 1780b in a manner that is invisible to storage clients 1710a-1710n.

Figure 18:
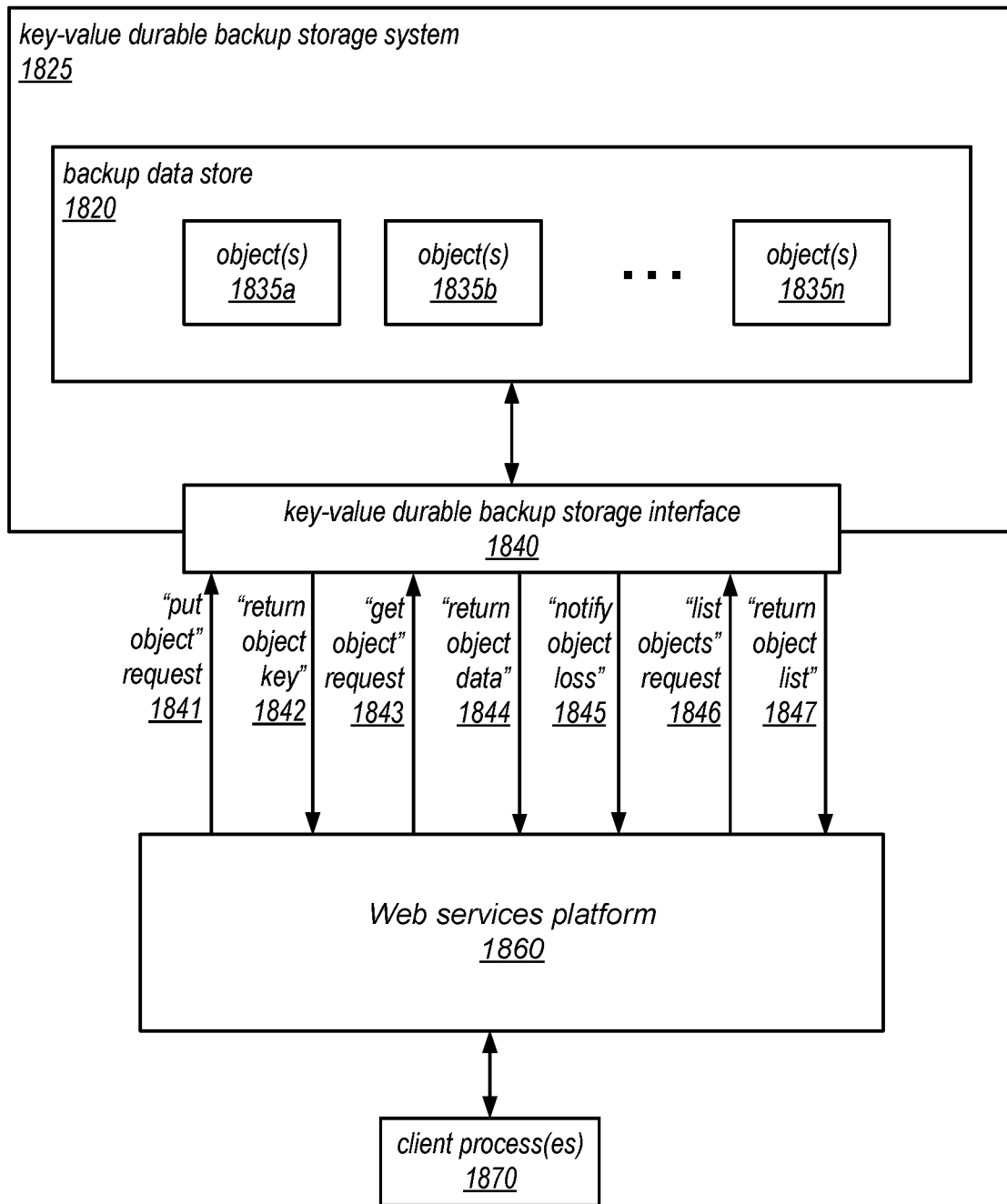
FIG. 18 is a block diagram illustrating the use of a remote key-value durable storage system for backing up tables stored on a Web services platform (e.g., by a scalable database service implemented thereon), according to one embodiment.

FIG. 18 is a block diagram illustrating the use of a remote key-value durable storage system for backing up a data stored on a Web services platform (e.g., by a scalable database service, such as that described herein) according to one embodiment. In some embodiments, each partition of a table stored in the scalable database service and backed up in the remote key-value durable backup storage system may be written as a separate data object having a unique ID (e.g., a combination of the BackupID for the partition, its partitionID, and/or another unique identifier) as its key. In this example, one or more client processes 1870 may store data in Web services platform 1860, which may leverage a key-value durable backup storage system 1825. The APIs 1841-1847 of key-value durable backup storage interface 1840 may expose functionality of the key-value durable backup storage system 1825 provided in backup data store 1820 to Web services platform 1860 as if Web services platform 1860 were a client of key-value durable backup storage system 1825. For example, Web services platform 1860 (or an administrative component thereof or an external workflow component invoked thereby) may perform functions such as uploading or retrieving data from backup data store 1820 through these APIs to perform backup and restore operations for data maintained in Web services platform 1860. As illustrated in FIG. 18, key-value durable backup storage system 1825 may store partitions (or packaged, compressed, and uploaded copies thereof) as objects in backup data store 1820 (shown as objects 1835a-1835n). As previously noted, each of the objects stored in backup data store 1820 of key-value durable backup storage system 1825 may be retrieved by Web services platform 1860 using a respective, unique key. In some embodiments, key-value durable backup storage system 1825 may provide high durability for stored objects (e.g., through the application of various types of redundancy schemes).

Note that in some embodiments, key-value durable backup storage system 1825 may store groups of objects in buckets, each of which has a unique bucket name across all regions and client/subscriber accounts. In some such embodiments, all backup-related objects (e.g., objects representing partitions and/or metadata for a table that was backed up to key-value durable backup storage system 1825) in a given region may be stored in a single (dedicated) bucket within key-value durable backup storage system 1825 that is owned by the Web services platform instance in that region, regardless of the table from which the objects (partitions) were uploaded or the clients/subscribers to whom they belong, and the clients/subscribers may have no visibility into (or knowledge of) the bucket into which their table information is backed up. In some embodiments, the Web services platform instance (or a component thereof) may be configured to store objects (e.g., partitions and/or metadata) to the particular bucket in key-value durable backup storage system 1825 that is dedicated for that purpose, and may specify the unique key for each object it stores. As noted above, the unique key for each partition being backed up may include a prefix indicating an identifier of the backup itself (e.g., a BackupID, which may be a UUID), a partition identifier (which may indicate the particular one of multiple replicas of the partition that is being backed up, and which may also be a UUID), and/or another unique string or other identifier, in different embodiments.

In the example illustrated in FIG. 18, Web services platform 1860 may back up partitions (or packaged, compressed, and uploaded copies thereof) to backup data store 1820 of key-value durable backup storage system 1825 according to a "put object" API (shown as 1841) and may receive acknowledgment of those operations through a corresponding "return object key" API (shown as 1842). In this example, partitions (or packaged, compressed, and uploaded copies thereof) stored as objects in backup data store 1820 may be retrieved from backup data store 1820 according to a "get object" API of key-value durable backup storage system 1825 (shown as 1843) and may receive the requested partitions (or packaged, compressed, and uploaded copies thereof) through a corresponding "return object data" API (shown as 1844). In some embodiments, key-value durable backup storage system 1825 may notify Web services platform 1860 when an object (e.g., representing a partition) that was stored by Web services platform 1860 in backup data store 1820 has been lost through a "notify object loss" API (shown as 1845). In other embodiments, the APIs provided by key-value durable backup storage system 1825 may include more, fewer, or different APIs for invoking or receiving responses to storage-related operations or other operations. For example, in some embodiments, the APIs for a key-value durable backup storage system may include a "delete object" API that includes the key of an object (e.g., a unique identifier of the object) as an input parameter. In such embodiments, in response to receiving a request to delete an object (e.g., one representing a backed up partition) according to this API, the key-value durable backup storage system 1825 may locate the object in backup data store 1820 (e.g., using the key) and may delete it from backup data store 1820.

In some embodiments, at one or more points during a backup operation (e.g., subsequent to the initiation of an operation to back up a table in key-value durable backup storage system 1825), an auto admin instance of Web services platform 1860 may be configured to poll key-value durable backup storage system 1825 (e.g., periodically) to determine whether all of the partitions of the table have been uploaded to key-value durable backup storage system 1825 as objects and/or whether those objects (partitions) cover all key ranges for the table. In such embodiments, Web services platform 1860 (or an auto admin instance thereof) may submit a request to key-value durable backup storage system 1825 to list all of the objects stored in key-value durable backup storage system 1825 (or all of the objects whose keys include a specified backup-specific prefix), and Web services platform 1860 (or an auto admin instance thereof) may compare the returned list of objects to the current list of partitions of the table to determine whether all of them have been backed up. For example, the APIs for a key-value durable backup storage system may include a "list objects" API that includes a key prefix as an input parameter. According to this API, in response to receiving a request to list the objects (e.g., the partitions) for which the key prefix includes a specified BackupID, the key-value durable backup storage system 1825 may locate the objects (the partitions of the table) in backup data store 1820 (e.g., using the specified BackupID prefix) and may return a list of those objects (partitions) that includes the complete unique key for each object (partition). In some embodiments, the response may also include additional metadata for each object (partition), such as a checksum value.

Note that in various embodiments, the API calls and responses between Web services platform 1860 and key-value durable backup storage interface APIs 1841-1847 in FIG. 18 may be performed over a secure proxy connection (e.g., one managed by a gateway control plane), or may be performed over the public network or, alternatively, over a private channel such as a virtual private network (VPN) connection. These and other APIs to the key-value durable backup storage system 1825 may be implemented according to different technologies, including, but not limited to, Simple Object Access Protocol (SOAP) technology and Representational state transfer (REST) technology. In other words, the APIs to the key-value durable backup storage system 1825 may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with the key-value durable backup storage system 1825.

In some embodiments, the backup files uploaded to the key-value durable backup storage system may contain metadata provided by the scalable database service implemented in the Web services platform. For example, they may contain information usable for cross-checking against system metadata. In some embodiments, a checksum of the compressed, packaged copy of each partition may be included in the object header for the object in which it is stored in the key-value durable backup storage system, and it may be used for verification during a restore operation for the partition.

In some embodiments, instead of (or in addition to) the object-related APIs illustrated in FIG. 18 and described above, the key-value durable backup storage system may support the following backup-related APIs for the use of the administrative components of the scalable database service implemented in the Web services platform (some of which may be implemented as combinations of various ones of the object-related APS):

UploadAndVerifyPartition(OperationId, BackupId, PartitionId)
DownloadPartition(OperationId, BackupId, OriginalPartitionId)
CreateReservationForRestorePartition(OperationId, PartitionId);
RestorePartition(ReservationId, OperationId, BackupId, OriginalPartitionId, TableProperties, PartitionProperties)

In some embodiments, the key-value durable backup storage system may utilize the following APIs in uploading a partition:

Initiate Multipart Upload(path, bucketName)
Upload Part(partNumber, uploadId, path, bucketName, MD5sum)
Complete Multipart Upload(partsList)
Abort Multipart Upload In some embodiments, the key-value durable backup storage system may utilize the "Get object" API (with a specified byte range) for downloading a partition.

In some embodiments, "UpdateTable" requests may continue to be serviced while backups are in progress. In some embodiments, if a partition split operation and a backup operation are issued at approximately the same time, the operation reaching the partition first will win and will complete the operation. Once the first operation has finished the second operation may proceed. In some embodiments, if a customer attempts to initiate multiple backups for the same table, the request may be de-duplicated at the request router, and the customer may get a response back indicating that a backup in progress. If the customer attempts to delete a table while a backup of the table is in progress, the DeleteTableAPI may return the status BackupInProgress. In some embodiments, there may be a maximum number of backups (or backup-related operations) that a subscriber can initiate at a time. In some embodiment, in order to support recovery from an erroneous deletion of a table, the deleteTable API may, by default, be configured to perform a backup of the targeted table prior to deleting it. In some such embodiments, a customer may be offered an opportunity to opt-out of this feature.

The methods described herein may in various embodiments be implemented by any combination of hardware and software. For example, in one embodiment, the methods may be implemented by a computer system that includes a processor executing program instructions stored on a non-transitory, computer-readable storage medium coupled to the processor. The program instructions may be configured to implement the functionality described herein (e.g., the functionality of various servers and other components that implement the scalable, distributed data storage systems and/or remote key-value durable backup storage systems described herein (or another type of remote storage system suitable for backing up tables and/or partitions thereof).

Figure 19:
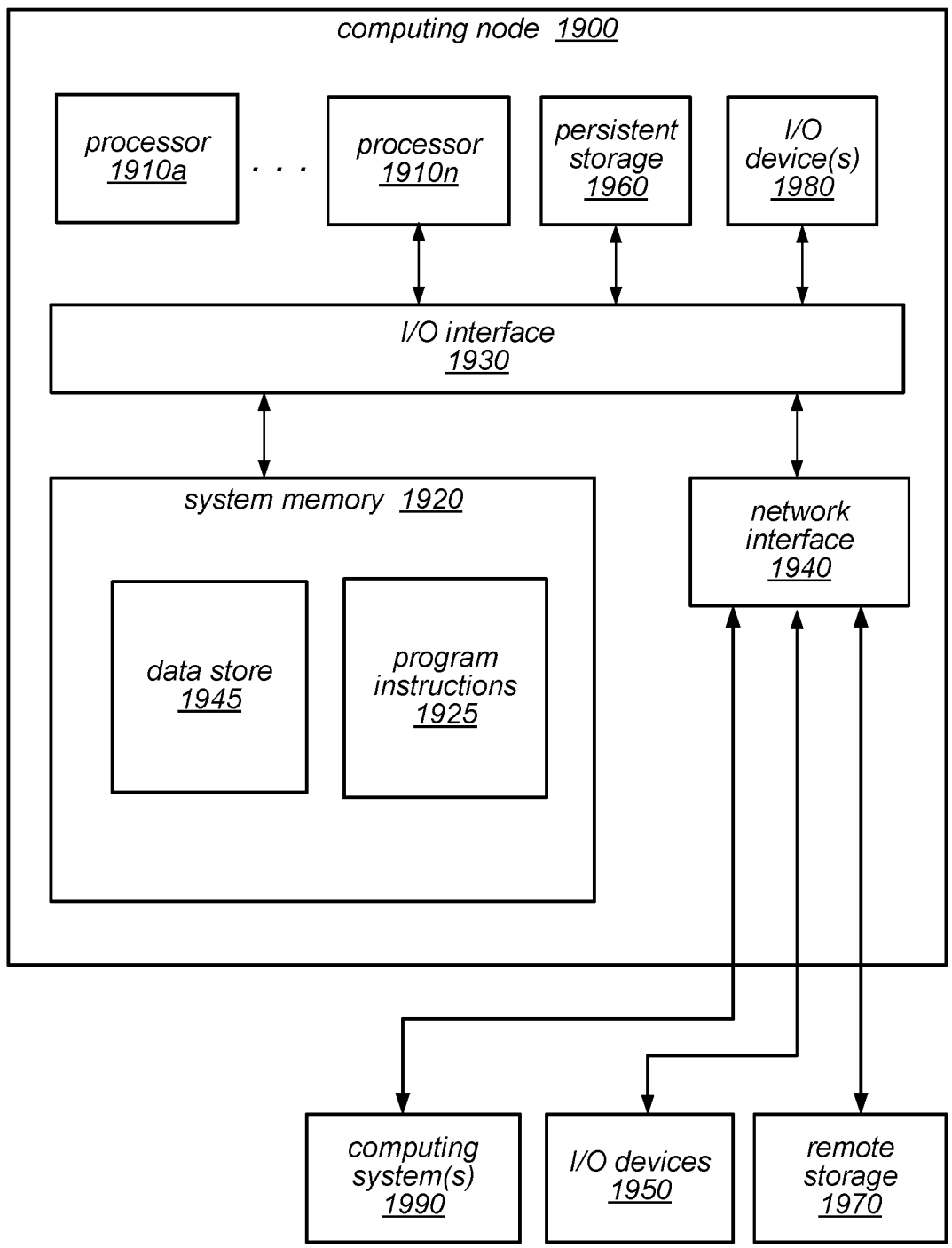
FIG. 19 is a block diagram illustrating a computing node that implements one or more of the techniques described herein for backing up database tables, verifying database tables to be backed up, and/or restoring database tables from a backup, according to various embodiments.

FIG. 19 is a block diagram illustrating a computing node configured to implement at least a portion of a scalable, distributed data storage systems and/or a corresponding key-value durable backup storage system (or other remote storage system), according to various embodiments. For example, computing node 1900 may represent a computing node that implements one or more of the techniques described herein for backing up database tables, verifying database tables to be backed up, and/or restoring database tables from a backup, according to various embodiments. In various embodiments, computing node 1900 may be configured to implement any or all of the components of a system that implements a scalable, distributed data storage system and a corresponding key-value durable backup storage system, or multiple computing nodes similar to or different from computing node 1900 may collectively provide this functionality. For example, in various embodiments, one or more computing nodes 1900 may implement any number of storage service clients 310, a front end module 340, any number of auto admin instances 350, any number of storage devices (such as storage node instances 360), and/or any other components of a Web services platform 330, an auto admin cluster, or external resources that interact with Web services platform 330 (such as external workflow component 370). Any number of those storage node instances 360 may each host one or more replicas of various data partitions and/or metadata associated therewith. For example, any given storage node instance 360 may host a replica acting as master replica for its replica group and/or a replica acting as a slave replica in its replica group.

In various embodiments, any or all of the techniques described herein for performing partitioning, repartitioning (e.g., through partition splitting and/or partition moving), replication, placement (of tables, partitions, or replicas), table/partition backup, backup object verification, and table/partition restoration, and/or otherwise managing partition data may be performed by one or more components of the storage node instances 360 that host a master replica and/or a slave replica, such as partition manager 470 and replication and failover component 475 illustrated in FIG. 4C or by one or more components of an auto admin instance 350 (e.g., partition management scheduler 420, which may include a sweeper component/module and/or an event scheduler component/module).

Similarly, one or more computing nodes 1900 may implement a key-value durable backup storage system (or an interface or other component thereof), in different embodiments. Computing node 1900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 1900, all of the computing nodes 1900 may include the same or similar hardware components, software components, and functionality, while in other embodiments the computing nodes 1900 comprising a computing system configured to implement the functionality described herein may include a wide variety of hardware components, software components, and functionality. In some embodiments, multiple computing nodes 1900 that collectively implement a data storage service or a remote storage system may be components of a larger shared resource system or grid computing system. It is noted that different elements of the system described herein may be implemented by different computing nodes 1900. For example, a computer system that supports the functionality described herein for performing backup and restore operations may be implemented on the same computing nodes 1900 on which clients (through which a customer or subscriber may access the system) execute, or on one or more other computing nodes 1900, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 1900.

In the illustrated embodiment, computing node 1900 includes one or more processors 1910 (any of which may include multiple cores, which may be single or multi-threaded) coupled to a system memory 1920 via an input/output (I/O) interface 1930. Computing node 1900 further includes a network interface 1940 coupled to I/O interface 1930. In various embodiments, computing node 1900 may be a uniprocessor system including one processor 1910, or a multiprocessor system including several processors 1910 (e.g., two, four, eight, or another suitable number). Processors 1910 may be any suitable processors capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA. Similarly, in a distributed computing system such as one that collectively implements a scalable database service or a remote storage service in which tables are baked up, each of the computing nodes may implement the same ISA, or individual computing nodes and/or replica groups of nodes may implement different ISAs.

The computing node 1900 also includes one or more network communication devices (e.g., network interface 1940) for communicating with other systems and/or components over a communications network (e.g. Internet, LAN, etc.). For example, a client application executing on computing node 1900 may use network interface 1940 to communicate with a server application executing on a single server or on a cluster of servers that implement a distributed system. In another example, an instance of a server application executing on computing node 1900 may use network interface 1940 to communicate with other instances of the server application that may be implemented on other computer systems.

In the illustrated embodiment, computing node 1900 also includes one or more persistent storage devices 1960 and/or one or more I/O devices 1980. In various embodiments, persistent storage devices 1960 may correspond to disk drives, tape drives, solid state memory, other mass storage devices, or any other persistent storage device. Computing node 1900 (or a distributed application or operating system operating thereon) may store instructions and/or data in persistent storage devices 1960, as desired, and may retrieve the stored instruction and/or data as needed.

Computing node 1900 includes one or more system memories 1920 that are configured to store instructions and/or data (shown as program instructions 1925 and data store 1945, respectively) that are accessible by processor(s) 1910. In various embodiments, system memories 1920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1920 may contain program instructions 1925 that are executable by processor(s) 1910 to implement the methods and techniques described herein.

In the illustrated embodiment, program instructions and data implementing desired functions, methods or techniques (such as functionality for backing up tables, verifying backup objects and/or restoring tables from backup using any or all of the mechanisms described herein), are shown stored within system memory 1920 as program instructions 1925. For example, program instruction 1925 may include program instructions that when executed on processor(s) 1910 implement any or all of a storage service client 310, a front end module 340 (which may include a user interface), an auto admin instance 350, a storage node instance 360, an admin console 465, a partition management partition management scheduler 420, a request router, a staging host, one or more metadata tables, an external workflow component 370, and/or any other components, modules, or sub-modules of a system that provides the data storage system and services described herein. Program instructions 1925 may also include program instructions configured to implement additional functionality of a system that implements a data storage service not described herein. In some embodiments, program instructions 1925 may include program instructions configured to implement functionality of a key-value durable backup storage system or another type of remote storage system suitable for backing up tables and/or partitions thereof. In some embodiments, program instructions 1925 may implement multiple separate clients, server nodes, and/or other components.

It is noted that in some embodiments, program instructions 1925 may include instructions and data implementing desired functions that are not directly executable by processor(s) 1910 but are represented or encoded in an abstract form that is translatable to instructions that are directly executable by processor(s) 1910. For example, program instructions 1925 may include instructions specified in an ISA that may be emulated by processor 1910, or by other program instructions 1925 executable on processor(s) 1910. Alternatively, program instructions 1925 may include instructions, procedures or statements implemented in an abstract programming language that may be compiled or interpreted in the course of execution. As non-limiting examples, program instructions 1925 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 1925 may include instructions executable to implement an operating system (not shown), which may be any of various operating systems, such as UNIX, LINUX, Solaris™, MacOS™, Windows™, etc. Any or all of program instructions 1925 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 1900 via I/O interface 1930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 1900 as system memory 1920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1940.

In other embodiments, program instructions and/or data as described herein for implementing a data storage service that employs the techniques described above may be received, sent or stored upon different types of computer-readable media or on similar media separate from system memory 1920 or computing node 1900. Program instructions and data stored on a computer-readable storage medium may be transmitted to a computing node 1900 for execution by a processor 1910 by transmission media or signals such as electrical, electromagnetic, or digital signals, which may be conveyed via a communication medium such as a network and/or a wireless link, such as may be implemented via network interface 1940.

In some embodiments, system memory 1920 may include data store 1945, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 1945 or in another portion of system memory 1920 on one or more nodes, in persistent storage 1960, and/or in remote storage 1970, in various embodiments. In some embodiments, and at various times, system memory 1920 (e.g., data store 1945 within system memory 1920), persistent storage 1960, and/or remote storage 1970 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 1970 may be a key-value durable storage system in which tables (and/or partitions thereof) are backed up and from which they are restored, as described herein.

Data store 1945 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 1930 may be configured to coordinate I/O traffic between processor(s) 1910, system memory 1920 and any peripheral devices in the system, including through network interface 1940 or other peripheral interfaces. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. Also, in some embodiments, some or all of the functionality of I/O interface 1930, such as an interface to system memory 1920, may be incorporated directly into processor 1910.

Network interface 1940 may be configured to allow data to be exchanged between computing node 1900 and other devices attached to a network, such as other computer systems 1990 (which may implement one or more server nodes and/or clients of a scalable, distributed data storage system and/or a remote key-value durable storage system), for example. In addition, network interface 1940 may be configured to allow communication between computing node 1900 and various I/O devices 1950 and/or remote storage 1970), or between other nodes in a system providing shared computing services. In general, network interface 1940 may be configured to allow data to be exchanged between computing node 1900 and any of a variety of communication devices, external storage devices, input/output devices and/or other computing devices, in different embodiments.

Input/output devices 1950 may, in some embodiments, include one or more display terminals, keyboards, keypads, touchpads, scanning devices, voice or optical recognition devices, or any other devices suitable for entering or retrieving data by one or more computing nodes 1900. Multiple input/output devices 1950 may be present in computing node 1900 or may be distributed on various nodes of a distributed system that includes computing node 1900. In some embodiments, similar input/output devices may be separate from computing node 1900 and may interact with one or more nodes of a distributed system that includes computing node 1900 through a wired or wireless connection, such as over network interface 1940. Network interface 1940 may commonly support one or more wireless networking protocols (e.g., Wi-Fi/IEEE 802.11, or another wireless networking standard). However, in various embodiments, network interface 1940 may support communication via any suitable wired or wireless general data networks, such as other types of Ethernet networks, for example. Additionally, network interface 1940 may support communication via telecommunications/telephony networks such as analog voice networks or digital fiber communications networks, via storage area networks such as Fibre Channel SANs, or via any other suitable type of network and/or protocol. In various embodiments, computing node 1900 may include more, fewer, or different components than those illustrated in FIG. 19 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 1900, and if so, may interact with various input/output devices 1950 to provide and/or receive information. Alternatively, other clients/users may use client computing systems to access the system, such as remotely via network interface 1940 (e.g., via the Internet and/or the World Wide Web). In addition, some or all of the computing nodes of a system providing the service may provide various feedback or other general types of information to clients/users (e.g., in response to user requests) via one or more input/output devices 1950.

It is noted that any of the distributed system embodiments described herein, or any of their components, may be implemented as one or more web services. For example, a front end module or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 1900 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1900 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1900 may be transmitted to computing node 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

The invention claimed is:

1. A system, comprising:
one or more processors and one or more memories having instructions that if executed by the one or more processors cause the one or more processors to:
store a table in a distributed data storage system, wherein the distributed data storage system stores data for the table in a set of multiple partitions on respective storage nodes,
wherein storage of data for the table in multiple partitions on respective storage nodes comprises storage of two or more replicas of each of the two or more partitions on respective storage nodes, wherein the two or more replicas of each of the two or more partitions constitute a replica group for the partition,
wherein the system is further configured to store metadata about each of the two or more partitions of the table in the distributed data storage system, and
wherein the metadata about each of the two or more partitions of the table comprises information about the members of the replica group for the partition; and
perform an independent backup operation for each of two or more partitions in the set of partitions in which data for the table is stored.

2. The system of claim 1, wherein the instructions if executed by the one or more processors cause the one or more processors to generate a respective, unique backup identifier for each of the two or more partitions.

3. The system of claim 1, wherein said performance of an independent backup operation for each of the two or more partitions comprises uploading the metadata about each of the two or more partitions of the table to a remote storage system.

4. The system of claim 1, wherein the instructions if executed by the one or more processors cause the one or more processors to:
store metadata about the table in the distributed data storage system, wherein performance of the independent backup operation for each of two or more partitions comprises updating the metadata about the table to indicate that a backup operation is in progress for the table.

5. The system of claim 1, wherein said performance of an independent backup operation for each of the two or more partitions comprises uploading a consistent view of each of the two or more partitions to a remote storage system, but does not guarantee that the consistent views of the two or more partitions that are uploaded to the remote storage system constitute a consistent view of the table.

6. The system of claim 1, wherein said performance of an independent backup operation for each of the two or more partitions comprises performance of the independent backup operation for each of the two or more partitions on a periodic basis or on a pre-determined schedule.

7. The system of claim 2, wherein said performance of an independent backup operation for each of the two or more partitions comprises uploading a copy of each of the two or more partitions to a remote storage system along with its respective unique backup identifier.

8. A method, comprising:
storing a table in a distributed data storage system, wherein the distributed data storage system stores data for the table in a set of multiple partitions on respective storage nodes, wherein storing data for the table in multiple partitions on respective storage nodes comprises storing two or more replicas of each of the two or more partitions on respective storage nodes, wherein the two or more replicas of each of the two or more partitions constitute a replica group for the partition;
storing metadata about each of the two or more partitions of the table in the distributed data storage system, wherein the metadata about each of the two or more partitions of the table comprises information about the members of the replica group for the partition; and
performing an independent backup operation for each of two or more partitions in the set of partitions in which data for the table is stored.

9. The method of claim 8, further comprising generating a respective, unique backup identifier for each of the two or more partitions.

10. The method of claim 8, wherein said performing an independent backup operation for each of the two or more partitions comprises uploading the metadata about each of the two or more partitions of the table to a remote storage system.

11. The method of claim 9, wherein said performing an independent backup operation for each of the two or more partitions comprises uploading a copy of each of the two or more partitions to a remote storage system along with its respective unique backup identifier.

12. The method of claim 8, wherein said performing an independent backup operation for each of the two or more partitions comprises uploading a consistent view of each of the two or more partitions to a remote storage system, but does not guarantee that the consistent views of the two or more partitions that are uploaded to the remote storage system constitute a consistent view of the table.

13. The method of claim 8, further comprising:
storing metadata about the table in the distributed data storage system,
wherein said performing an independent backup operation for each of two or more partitions comprises updating the metadata about the table to indicate that a backup operation is in progress for the table.

14. The method of claim 8, further comprising:
performing the independent backup operation for each of the two or more partitions on a periodic basis or on a pre-determined schedule.

15. A non-transitory, computer-readable storage medium storing program instructions that when executed on one or more computers cause the one or more computers to perform:
for a distributed data storage system that stores data for a table in two or more partitions on respective storage nodes of the distributed data storage system:
obtaining a list of the multiple partitions in which data for the table is stored prior to performing an independent backup operation for each of the two or more partitions; and
performing the independent backup operation for each of the two or more partitions,
wherein said performing the independent backup operation for each of the two or more partitions comprises:
initiating performance of an independent backup operation for each of the multiple partitions on the list;
subsequent to said initiating, determining that the set of partitions in which data for the table is stored has changed; and
in response to said determining that the set of partitions in which data for the table is stored has changed, obtaining a current list of partitions in which data for the table is stored, wherein the current list of partitions comprises the two or more partitions.

16. The non-transitory, computer-readable storage medium of claim 15, wherein said performing an independent backup operation for each of the two or more partitions comprises uploading a consistent view of each of the two or more partitions to a remote storage system, but does not guarantee that the consistent views of the two or more partitions that are uploaded to the remote storage system constitute a consistent view of the table.

17. The non-transitory, computer-readable storage medium of claim 15, storing additional program instructions that when executed on one or more computers cause the one or more computers to:
perform the independent backup operation for each of the two or more partitions on a periodic basis or on a pre-determined schedule.

18. The non-transitory, computer-readable storage medium of claim 15, storing program instructions that cause the one or more computers to perform:
subsequent to said performing, receiving a request to restore the table from a remote storage system in which it was backed up; and
in response to receiving the request to restore the table:
creating a new table in which to restore the data for the table; and
initiating an operation to import each of the two or more partitions into the new table from the remote storage system.

19. The non-transitory, computer-readable storage medium of claim 15, wherein said performing an independent backup operation for each of the two or more partitions further comprises uploading a copy of each of the two or more partitions to a remote storage system.

20. The non-transitory, computer-readable storage medium of claim 15, wherein said determining that the set of partitions in which data for the table is stored has changed comprises determining that an additional partition stores data for the table, that a partition on the list has been deleted, that a partition on the list has been split into two or more new partitions, or that a partition on the list has been merged with another partition.

* * * * *